United States Patent
Mizuno

(10) Patent No.: US 9,860,566 B2
(45) Date of Patent: Jan. 2, 2018

(54) IMAGE DECODING APPARATUS AND IMAGE DECODING METHOD

(71) Applicant: MegaChips Corporation, Osaka-shi (JP)

(72) Inventor: Yusuke Mizuno, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 0 days.

(21) Appl. No.: 15/276,512

(22) Filed: Sep. 26, 2016

(65) Prior Publication Data

US 2017/0013278 A1 Jan. 12, 2017

Related U.S. Application Data

(63) Continuation of application No. PCT/JP2015/057133, filed on Mar. 11, 2015.

(30) Foreign Application Priority Data

Mar. 28, 2014 (JP) .................................. 2014-068542

(51) Int. Cl.
G06K 9/46 (2006.01)
H04N 19/64 (2014.01)
(Continued)

(52) U.S. Cl.
CPC ......... *H04N 19/647* (2014.11); *H04N 19/117* (2014.11); *H04N 19/13* (2014.11);
(Continued)

(58) Field of Classification Search
CPC .... H04N 19/647; H04N 19/117; H04N 19/13; H04N 19/167; H04N 19/172;
(Continued)

(56) References Cited

U.S. PATENT DOCUMENTS

2005/0196062 A1* 9/2005 Cho ..................... H04N 19/176
382/240
2006/0045381 A1* 3/2006 Matsuo ................ H04N 19/139
382/276

FOREIGN PATENT DOCUMENTS

JP 2001-520466 A 10/2001
JP 2002-94991 A 3/2002
(Continued)

OTHER PUBLICATIONS

International Standard ISO/IEC 15444-1 ITU-T Recommendation, T.800 Information Technology—JPEG 2000 Image coding system: Core coding system, Annex H—Coding of images with regions of interest (209 pages).

(Continued)

*Primary Examiner* — Tung Vo
*Assistant Examiner* — Joseph Becker
(74) *Attorney, Agent, or Firm* — Oblon, McClelland, Maier & Neustadt, L.L.P.

(57) ABSTRACT

Circuitry configured to generate an ROI mask by determining whether each of quantized wavelet coefficients constituting quantized image data is associated with an ROI or a non-ROI in an original image on the basis of the scaling amount of the Max-shift method, generate first image data by performing inverse quantization on the quantized image data after being scaled down, generate second image data having a specified decomposition level by performing inverse wavelet transformation on the first image data, generate a restored ROI mask having the same decomposition level as that of the second image data by performing a predetermined process on the ROI mask once or a plurality of times, generate masked image data by applying the restored ROI mask to the second image data, and perform (Continued)

the inverse wavelet transformation on the masked image data until a decomposition level becomes zero.

18 Claims, 16 Drawing Sheets

(51) Int. Cl.
| | |
|---|---|
| *H04N 19/172* | (2014.01) |
| *H04N 19/117* | (2014.01) |
| *H04N 19/13* | (2014.01) |
| *H04N 19/167* | (2014.01) |
| *H04N 19/63* | (2014.01) |
| *H04N 19/46* | (2014.01) |
| *H04N 19/146* | (2014.01) |
| *H04N 19/124* | (2014.01) |
| *H04N 19/30* | (2014.01) |

(52) U.S. Cl.
CPC ......... *H04N 19/167* (2014.11); *H04N 19/172* (2014.11); *H04N 19/63* (2014.11); *H04N 19/124* (2014.11); *H04N 19/146* (2014.11); *H04N 19/30* (2014.11); *H04N 19/46* (2014.11)

(58) Field of Classification Search
CPC .... H04N 19/63; H04N 19/124; H04N 19/146; H04N 19/30; H04N 19/46
See application file for complete search history.

(56) References Cited

FOREIGN PATENT DOCUMENTS

| | | | |
|---|---|---|---|
| JP | 2002-528007 | A | 8/2002 |
| JP | 2006-203409 | A | 8/2006 |
| JP | 2006-279397 | A | 10/2006 |
| JP | 2006-295299 | A | 10/2006 |
| JP | 2007-312399 | A | 11/2007 |
| JP | 2011-166795 | A | 8/2011 |

OTHER PUBLICATIONS

Hiroshi Watanabe and Takeo Ogita, "Transcoding by Automatic ROI Extraction from JPEG2000 bitstream", Proceeding of Picture Coding Symposium, 2003, pp. 227-230.
International Search Report dated Sep. 9, 2016 for PCT/JP2015/057133 filed Mar. 11, 2015 (2 pages).
Charilaos Christopoulos, Joel Askelof, Mathias Larsson, Efficient Encoding and Reconstruction of Regions of Interest in JPEG2000, Signal Processing Conference, 2000 10th European, Sep. 8, 2000, P. 1-4, ISBN: 978-952-1504-43-3 (4 pages).
Keun-hyeong Park, Hyun Wook Park, Region-of-Interest Coding Based on Set Partitioning in Hierarchical Trees, Circuits and Systems for Video Technology, IEEE Transactions on, Aug. 7, 2002, vol. 12, Issue 2, p. 106-113, ISSN: 1051-8215 (8 pages).
International Standard ISO/IEC 15444-1 ITU-T Recommendation, T.800 Information Technoogy—JPEG 2000 image coding system: Core coding system, Annex H—Coding of images with regions of interest (209 pages).

* cited by examiner

F I G. 2

| DECOMPOSITION LEVEL 1 | |
|---|---|
| LL1 | HL1 |
| LH1 | HH1 |

F I G. 3

DECOMPOSITION LEVEL 2

| LL2 | HL2 | HL1 |
|---|---|---|
| LH2 | HH2 | |
| LH1 | | HH1 |

F I G. 4

DECOMPOSITION LEVEL 3

| LL3 | HL3 | HL2 | HL1 |
|---|---|---|---|
| LH3 | HH3 | | |
| LH2 | | HH2 | |
| LH1 | | | HH1 |

F I G . 1 8
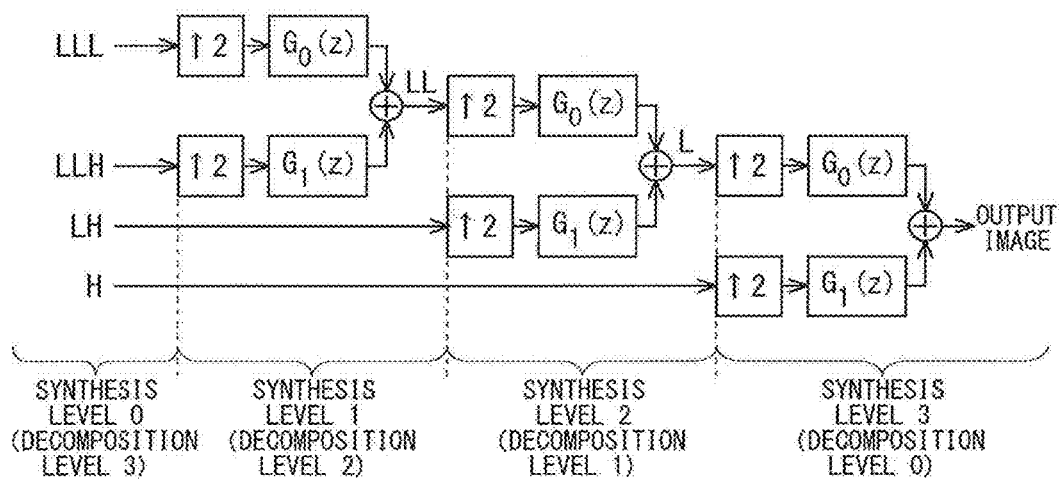
F I G . 1 9
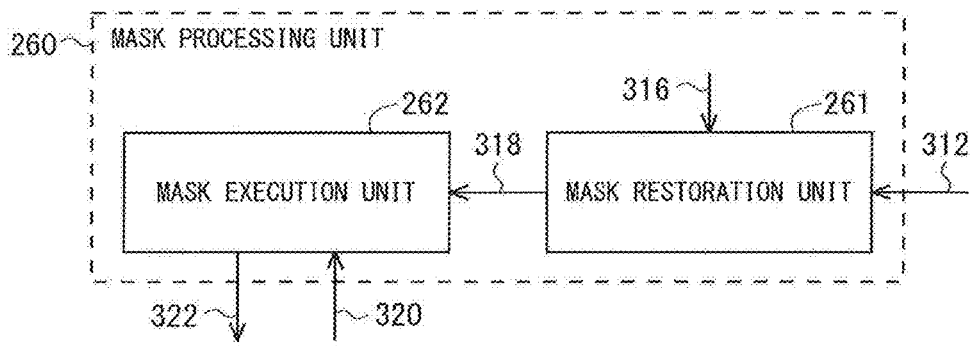
F I G . 2 0
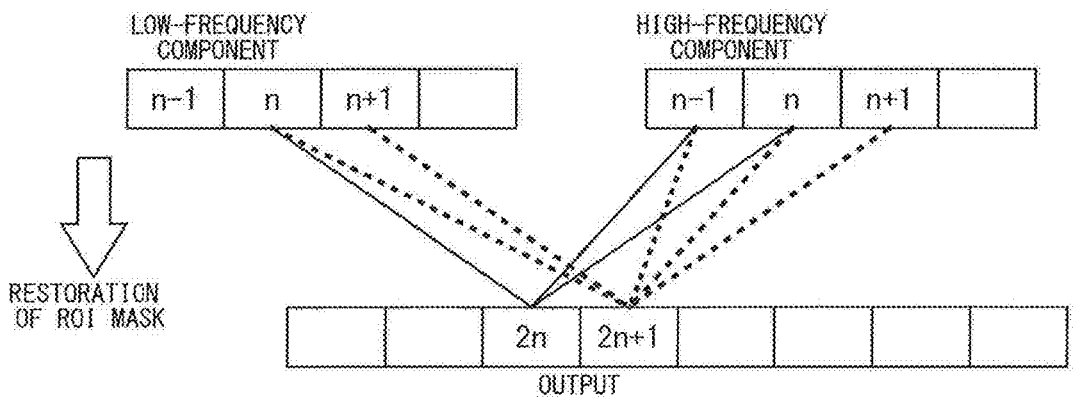

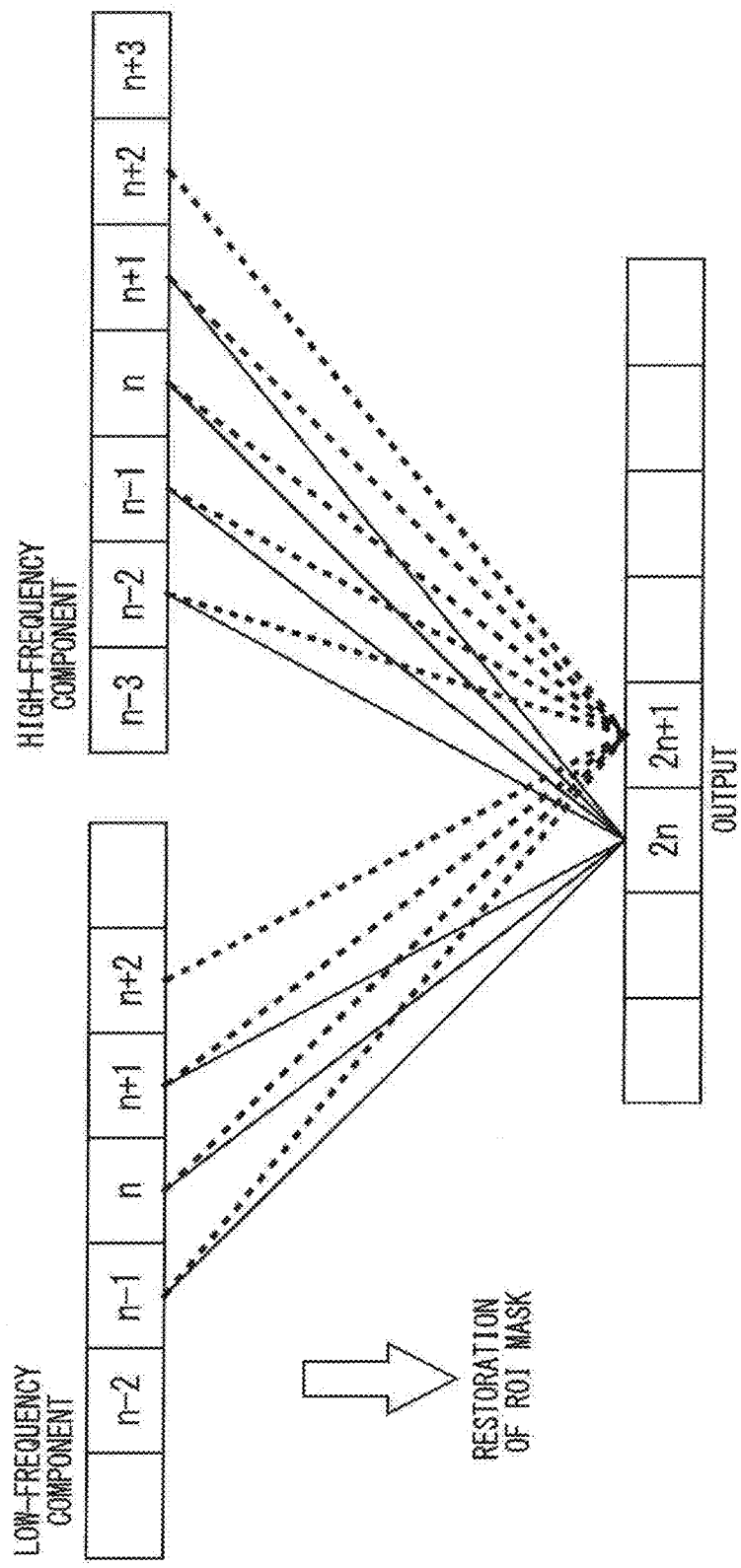

F I G . 2 2
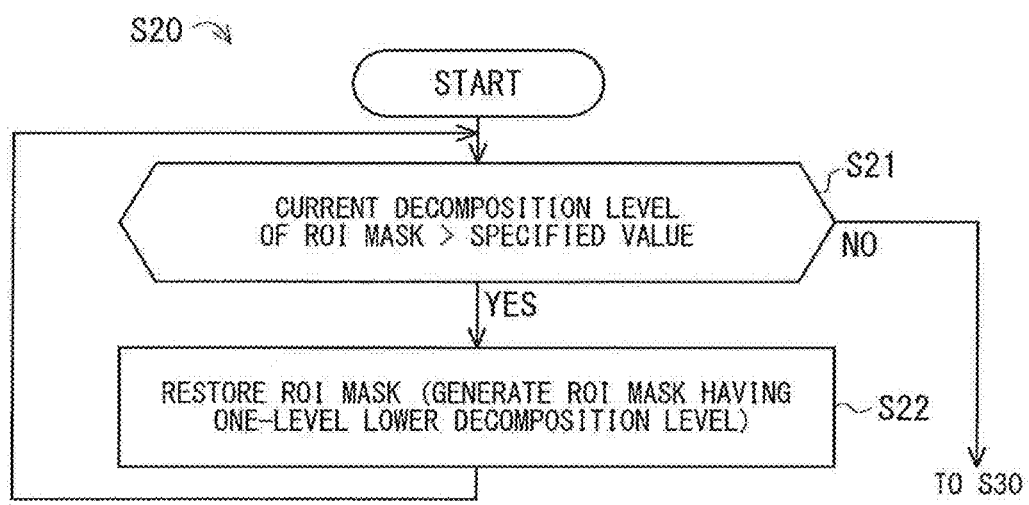
F I G . 2 3
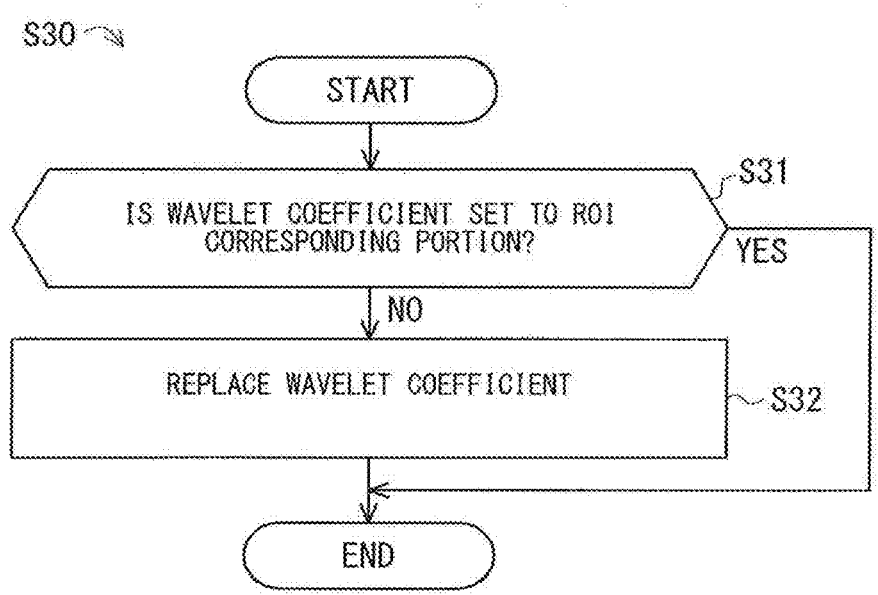

F I G. 2 8
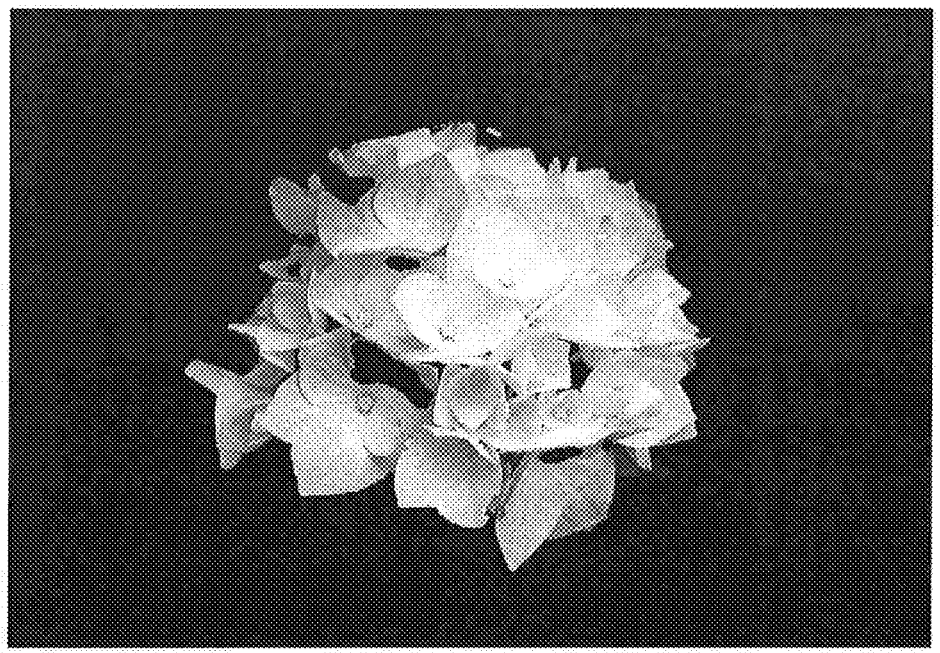
F I G. 2 9
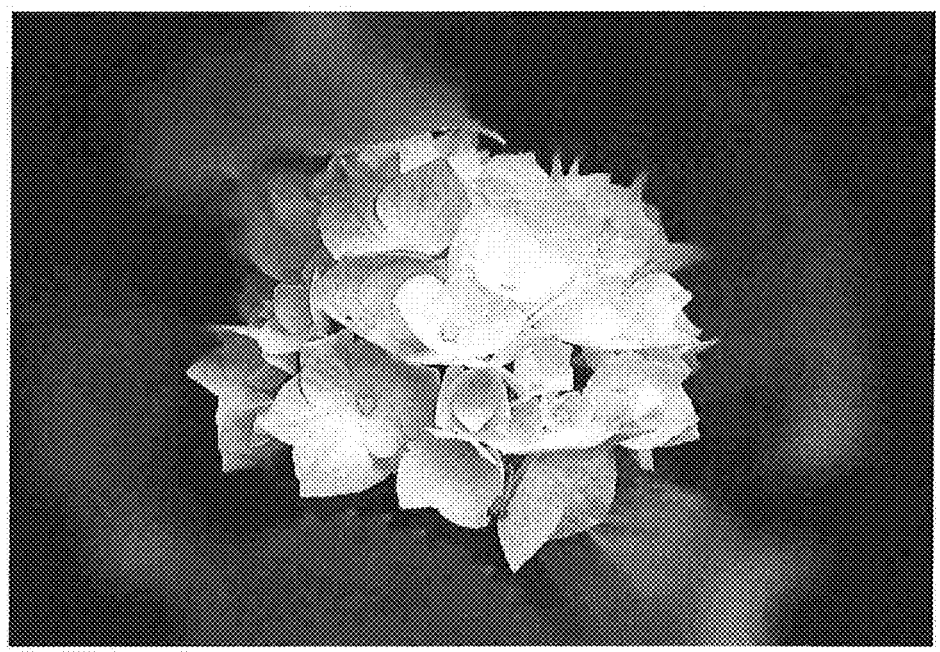

IMAGE DECODING APPARATUS AND IMAGE DECODING METHOD

BACKGROUND OF THE INVENTION

Field of the Invention

The present invention relates to an image decoding technique, and more specifically to a technique for decoding an image including an ROI (Region Of Interest).

Description of the Background Art

On JPEG (Joint Photographic Experts Group) 2000, coding and decoding of an image including an ROI is disclosed in INTERNATIONAL STANDARD ISO/IEC 15444-1 ITU-T RECOMMENDATION T.800 Information technology-JPEG 2000 image coding system: Core coding system Annex H—Coding of images with regions of interest. Specifically, a Max-shift method is disclosed. Further, disclosed is a method of developing an ROI on a wavelet plane.

In Japanese Translation of PCT International Application Publication No. 2001-520466 disclosed is a method of developing which of coefficients belongs to an ROI on the wavelet plane, though the type of the method is different from that used for a wavelet filter adopted in JPEG 2000. Further, an image processing technique on an image including an ROI is disclosed in Japanese Patent Application Laid Open Gazette No. 2006-203409, Japanese Translation of PCT International Application Publication No. 2002-528007, Japanese Patent Application Laid Open Gazette No. 2006-295299, Japanese Patent Application Laid Open Gazette No. 2006-279397, and Japanese Patent Application Laid Open Gazette No. 2011-166795.

SUMMARY OF THE INVENTION

Techniques for achieving high quality of an ROI in an original image have been conventionally developed. In contrast, it is an object of the present invention to provide a new image processing technique on an ROI, more specifically to provide a technique that makes it possible to cut out a region specified as an ROI in an original image and also possible to adjust a boundary of the cut-out region.

The present invention is intended for an image decoding apparatus. According to a first aspect of the present invention, the image decoding apparatus includes circuitry configured to extract coded image data and additional information on a scaling amount of the Max-shift method from a bit stream coded by using wavelet transformation, generate quantized image data constituted of a plurality of quantized wavelet coefficients by decoding the coded image data, generate an ROI (Region Of Interest) mask corresponding to a decomposition level of the quantized image data, by determining whether each of the plurality of quantized wavelet coefficients is associated with an ROI or a non-ROI in an original image on the basis of the scaling amount, generate first image data constituted of a plurality of wavelet coefficients by performing inverse quantization on the quantized image data after being scaled down on the basis of the scaling amount, generate second image data having a specified decomposition level by performing inverse wavelet transformation on the first image data, generate a restored ROI mask having the same decomposition level as that of the second image data by performing a predetermined mask restoration process on the ROI mask once or a plurality of times, generate masked image data by applying the restored ROI mask to the second image data, and generate decoded image data by performing the inverse wavelet transformation on the masked image data until a decomposition level becomes zero.

According to a second aspect of the present invention, in the image decoding apparatus of the first aspect, the circuitry is configured to generate the masked image data by applying the ROI mask instead of the restored ROI mask, to the first image data instead of the second image data, when the specified decomposition level is the same decomposition level as that of the first image data.

According to a third aspect of the present invention, in the image decoding apparatus of the first or second aspect, when the specified decomposition level is a decomposition level of zero, the masked image data is handled as the decoded image data, without being subjected to the inverse wavelet transformation.

According to a fourth aspect of the present invention, in the image decoding apparatus of any one of the first to third aspects, the ROI mask and the restored ROI mask include an ROI corresponding portion and a non-ROI corresponding portion corresponding to the ROI and the non-ROI in the original image, respectively, and the circuitry is configured to generate the masked image data by replacing data which is set to the non-ROI corresponding portion in image data to be masked, with zero.

According to a fifth aspect of the present invention, in the image decoding apparatus of any one of the first to third aspects, the ROI mask and the restored ROI mask include an ROI corresponding portion and a non-ROI corresponding portion corresponding to the ROI and the non-ROI in the original image, respectively, and the circuitry is configured to generate the masked image data by replacing data which is set to the non-ROI corresponding portion in image data to be masked, with another data on another original image.

According to a sixth aspect of the present invention, in the image decoding apparatus of any one of the first to fifth aspects, the predetermined mask restoration process is a process of generating a second ROI mask from a first ROI mask to be restored, on the basis of a predetermined mask restoration condition, the second ROI mask has a decomposition level which is lower than that of the first ROI mask by one level, the predetermined mask restoration condition in a case where a 5×3 filter is used for the inverse wavelet transformation includes a first condition and a second condition, where n is an integer, and the first condition defines that when at least one of n-th data in a low-frequency component and $\{n-1\}$th data and n-th data in a high-frequency component is associated with the ROI in the original image by the first ROI mask before the inverse wavelet transformation, the second ROI mask is formed so that 2n-th data is associated with the ROI after the inverse wavelet transformation, and the second condition defines that when at least one of the n-th data and $\{n+1\}$th data in the low-frequency component and the $\{n-1\}$th data to $\{n+1\}$th data in the high-frequency component is associated with the ROI by the first ROI mask before the inverse wavelet transformation, the second ROI mask is formed so that $\{2n+1\}$th data is associated with the ROI after the inverse wavelet transformation.

According to a seventh aspect of the present invention, in the image decoding apparatus of any one of the first to fifth aspects, the predetermined mask restoration process is a process of generating a second ROI mask from a first ROI mask to be restored, on the basis of a predetermined mask restoration condition, the second ROI mask has a decomposition level which is lower than that of the first ROI mask by one level, the predetermined mask restoration condition in a case where a Daubechies 9×7 filter is used for the inverse wavelet transformation includes a third condition and a fourth condition, where n is an integer, and the third condition defines that when at least one of {n−1}th data to {n+1}th data in a low-frequency component and {n−2}th data to {n+1}th data in a high-frequency component is associated with the ROI in the original image by the first ROI mask before the inverse wavelet transformation, the second ROI mask is formed so that 2n-th data is associated with the ROI after the inverse wavelet transformation, and the fourth condition defines that when at least one of the {n−1}th data to {n+2}th data in the low-frequency component and the {n−2}th data to {n+2}th data in the high-frequency component is associated with the ROI by the first ROI mask before the inverse wavelet transformation, the second ROI mask is formed so that {2n+1}th data is associated with the ROI after the inverse wavelet transformation.

According to an eighth aspect of the present invention, in the image decoding apparatus of any one of the first to seventh aspects, the bit stream conforms to JPEG (Joint Photographic Experts Group) 2000.

According to a ninth aspect of the present invention, in the image decoding apparatus of any one of the first to eighth aspects, performing the predetermined mask restoration process a plurality of times includes performing the predetermined mask restoration process recursively a plurality of times.

The present invention is also intended for an image decoding method. According to a tenth aspect of the present invention, the image decoding method includes extracting coded image data and additional information on a scaling amount of the Max-shift method from a bit stream coded by using wavelet transformation, generating quantized image data constituted of a plurality of quantized wavelet coefficients by decoding the coded image data, generating an ROI (Region Of Interest) mask corresponding to a decomposition level of the quantized image data, by determining whether each of the plurality of quantized wavelet coefficients is associated with an ROI or a non-ROI in an original image on the basis of the scaling amount, generating first image data constituted of a plurality of wavelet coefficients by performing inverse quantization on the quantized image data after being scaled down on the basis of the scaling amount, generating second image data having a specified decomposition level by performing inverse wavelet transformation on the first image data, generating a restored ROI mask having the same decomposition level as that of the second image data by performing a predetermined mask restoration process on the ROI mask once or a plurality of times, generating masked image data by applying the restored ROI mask to the second image data, and generating decoded image data by performing the inverse wavelet transformation on the masked image data until a decomposition level becomes zero.

According to an eleventh aspect of the present invention, in the image decoding method of the tenth aspect, when the specified decomposition level is the same decomposition level as that of the first image data, the masked image data is generated by applying the ROI mask instead of the restored ROI mask, to the first image data instead of the second image data.

According to a twelfth aspect of the present invention, in the image decoding method of the tenth or eleventh aspect, when the specified decomposition level is a decomposition level of zero, the masked image data is handled as the decoded image data, without being subjected to the inverse wavelet transformation.

According to a thirteenth aspect of the present invention, in the image decoding method of any one of the tenth to twelfth aspects, the ROI mask and the restored ROI mask include an ROI corresponding portion and a non-ROI corresponding portion corresponding to the ROI and the non-ROI in the original image, respectively, and the masked image data is generated by replacing data which is set to the non-ROI corresponding portion in image data to be masked, with zero.

According to a fourteenth aspect of the present invention, in the image decoding method of any one of the tenth to twelfth aspects, the ROI mask and the restored ROI mask include an ROI corresponding portion and a non-ROI corresponding portion corresponding to the ROI and the non-ROI in the original image, respectively, and the masked image data is generated by replacing data which is set to the non-ROI corresponding portion in image data to be masked, with another data on another original image.

According to a fifteenth aspect of the present invention, in the image decoding method of any one of the tenth to fourteenth aspects, the predetermined mask restoration process is a process of generating a second ROI mask from a first ROI mask to be restored, on the basis of a predetermined mask restoration condition, the second ROI mask has a decomposition level which is lower than that of the first ROI mask by one level, the predetermined mask restoration condition in a case where a 5×3 filter is used for the inverse wavelet transformation includes a first condition and a second condition, where n is an integer, and the first condition defines that when at least one of n-th data in a low-frequency component and {n−1}th data and n-th data in a high-frequency component is associated with the ROI in the original image by the first ROI mask before the inverse wavelet transformation, the second ROI mask is formed so that 2n-th data is associated with the ROI after the inverse wavelet transformation, and the second condition defines that when at least one of the n-th data and {n+1}th data in the low-frequency component and the {n−1}th data to {n+1}th data in the high-frequency component is associated with the ROI by the first ROI mask before the inverse wavelet transformation, the second ROI mask is formed so that {2n+1}th data is associated with the ROI after the inverse wavelet transformation.

According to a sixteenth aspect of the present invention, in the image decoding method of any one of the tenth to fourteenth aspects, the predetermined mask restoration process is a process of generating a second ROI mask from a first ROI mask to be restored, on the basis of a predetermined mask restoration condition, the second ROI mask has a decomposition level which is lower than that of the first ROI mask by one level, the predetermined mask restoration condition in a case where a Daubechies 9×7 filter is used for the inverse wavelet transformation includes a third condition and a fourth condition, where n is an integer, and the third condition defines that when at least one of {n−1}th data to {n+1}th data in a low-frequency component and {n−2}th data to {n+1}th data in a high-frequency component is associated with the ROI in the original image by the first ROI mask before the inverse wavelet transformation, the second ROI mask is formed so that 2n-th data is associated with the ROI after the inverse wavelet transformation, and the fourth condition defines that when at least one of the {n−1}th data to {n|2}th data in the low-frequency component and the {n−2}th data to {n+2}th data in the high-frequency component is associated with the ROI by the first ROI mask before the inverse wavelet transformation, the second ROI mask is formed so that {2n+1}th data is associated with the ROI after the inverse wavelet transformation.

According to a seventeenth aspect of the present invention, in the image decoding method of any one of the tenth to sixteenth aspects, the bit stream conforms to JPEG (Joint Photographic Experts Group) 2000.

According to an eighteenth aspect of the present invention, in the image decoding method of any one of the tenth to seventeenth aspects, performing the predetermined mask restoration process a plurality of times includes performing the predetermined mask restoration process recursively a plurality of times.

According to the above-described first and tenth aspects of the present invention, a region specified as an ROI in an original image can be cut out. A boundary of the region cut out from the original image can be adjusted in accordance with the specified decomposition level. Since the Max-shift method is used, it is not necessary to separately acquire the data of the ROI mask. Further, also according to the second to ninth aspects dependent on the first aspect and the eleventh to eighteenth aspects dependent on the tenth aspect, the same effects can be produced.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a view showing a mallat-type wavelet plane (decomposition level 1);

FIG. 3 is a view showing a mallat-type wavelet plane (decomposition level 2);

FIG. 4 is a view showing a mallat-type wavelet plane (decomposition level 3);

FIG. 18 is a diagram illustrating a two-divided filter bank group which achieves one-dimensional inverse wavelet transformation;

FIG. 19 is a block diagram showing a mask processing unit;

FIG. 20 is a diagram showing restoration of an ROI mask in a case where the inverse wavelet transformation is performed by using the 5×3 filter;

FIG. 21 is a diagram showing restoration of an ROI mask in a case where the inverse wavelet transformation is performed by using the Daubechies 9×7 filter;

FIG. 22 is a flowchart showing an operation of a mask restoration unit;

FIG. 23 is a flowchart showing an operation of a mask execution unit;

FIG. 28 is a view showing a decoded image in a case where a specified value of the decomposition level is 0; and FIG. 29 is a view showing an image decoded by a conventional method.

DESCRIPTION OF THE PREFERRED EMBODIMENT(S)

In this preferred embodiment, an image coding apparatus will be first described, and then an image decoding apparatus will be described. In general, coding is adopted for compression of image data, and therefore the words of "compression" and "coding" are sometimes used as synonymous words. In consideration of this point, an image coding apparatus may be called as, for example, an "image compression apparatus" or an "image compression-coding apparatus". Similarly, in consideration of a fact that the words of "expansion" and "decoding" are sometimes used as synonymous words, an image decoding apparatus may be called as, for example, an "image expansion apparatus" or an "image expansion-decoding apparatus".

<Image Coding Apparatus 10>

Figure 1:
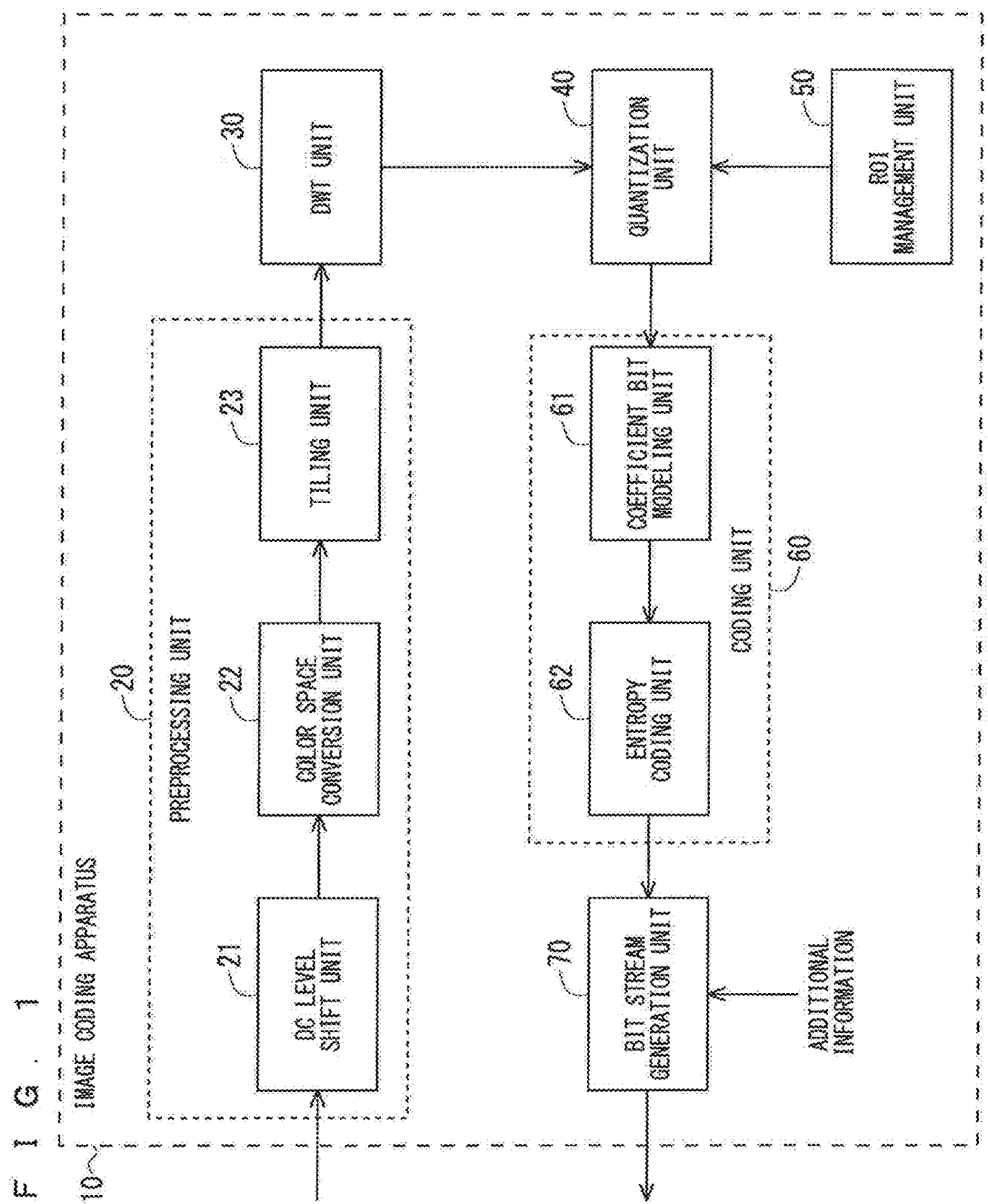
FIG. 1 is a block diagram showing an image coding apparatus.

FIG. 1 is a block diagram illustrating an image coding apparatus. The image coding apparatus 10 illustrated in FIG. 1 includes a preprocessing unit 20, a wavelet transformation unit (hereinafter, also referred to as a DWT unit) 30, a quantization unit 40, an ROI management unit 50, a coding unit 60, and a bit stream generation unit 70.

<Preprocessing Unit 20>

The preprocessing unit 20 performs a predetermined preprocessing on input image data to be compressed. In the exemplary case of FIG. 1, the preprocessing unit 20 includes a DC level shift unit 21, a color space conversion unit 22, and a tiling unit 23.

The DC level shift unit 21 converts a DC level of the input image data as necessary. The color space conversion unit 22 converts a color space of the image data after being subjected to the DC-level conversion. For example, a RGB component is converted into a YCbCr component (consisting of a luminance component Y and color difference components Cb and Cr). The tiling unit 23 divides the image data after being subjected to the color-space conversion into a plurality of region components each of which is called a "tile" and has a rectangular shape. Then, the tiling unit 23 supplies the image data to the DWT unit 30 in a unit of tile. Further, it is not always necessary to divide the image data into the tiles, and a frame of image data outputted from the color space conversion unit 22 may be directly supplied to the DWT unit 30.

<DWT Unit 30>

The DWT unit 30 performs integer-type or real-number-type discrete wavelet transformation (DWT) on the image data supplied from the tiling unit 23 in a unit of tile, and outputs a transformation coefficient obtained as the result of the DWT. Hereinafter, the transformation coefficient is sometimes termed, for example, a "wavelet transformation coefficient" or a "wavelet coefficient".

In the DWT, two-dimensional image data is decomposed into a high-frequency component and a low-frequency component. The frequency decomposition (frequency resolution) is also termed, for example, band division or band decomposition. Each of the band components obtained by the frequency decomposition (i.e., the low-frequency component and the high-frequency component) is also referred to as a sub-band. As the basic scheme of JPEG 2000, adopted is an octave division scheme in which only the band components on the low-frequency side obtained by the frequency decomposition both in the vertical and horizontal directions are recursively band-divided. The number of executions of the recursive band division is termed a decomposition level.

FIGS. 2 to 4 are views each showing a mallat-type wavelet plane in the two-dimensional DWT. In the exemplary cases of FIGS. 2 to 4, at the decomposition level 1 (see FIG. 2), the input image (two-dimensional image) is subjected to the frequency decomposition with respect to both the vertical and horizontal directions. The image is thereby decomposed into four band components HH1, HL1, LH1, and LL1, as shown in FIG. 2.

The band component LL1 obtained at the decomposition level 1 is further decomposed into four band components HH2, HL2, LH2, and LL2 at the decomposition level 2 (see FIG. 3). The band component LL2 obtained at the decomposition level 2 is further decomposed into four band components HH3, HL3, LH3, and LL3 at the decomposition level 3 (see FIG. 4). Further, the set value for the decomposition level is not limited to 3.

As to the notation on the two-dimensional DWT, for example, "HL1" is a band component consisting of a horizontal high-frequency component H and a vertical low-frequency component L at the decomposition level 1. The notation is generalized as "XYm" (Each of "X" and "Y" is either one of H and L. "m" is an integer of 1 or more). Specifically, a band component consisting of a horizontal band component X and a vertical band component Y at a decomposition level m is represented as "XYm".

Herein, the wavelet plane (see FIGS. 2 to 4) is a data group in which calculation result data of the DWT is two-dimensionally arrayed, being associated with an arrangement of pixels in an original image. For example, in a region represented as the band component LL1 on the wavelet plane, the calculation result data (LL component data) obtained by using a pixel in the original image as a pixel of interest are arranged corresponding to the position of the pixel of interest in the original image. Further, the wavelet plane is sometimes termed a wavelet space, a wavelet region, or a wavelet image.

Figure 5:
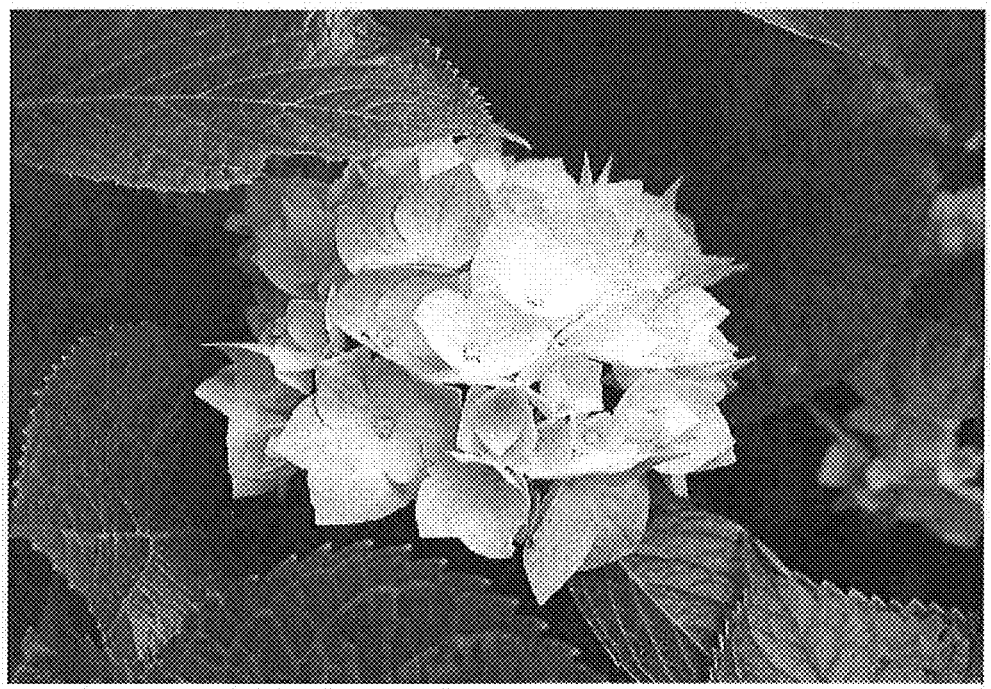
FIG. 5 is a view showing an exemplary original image.
Figure 6:
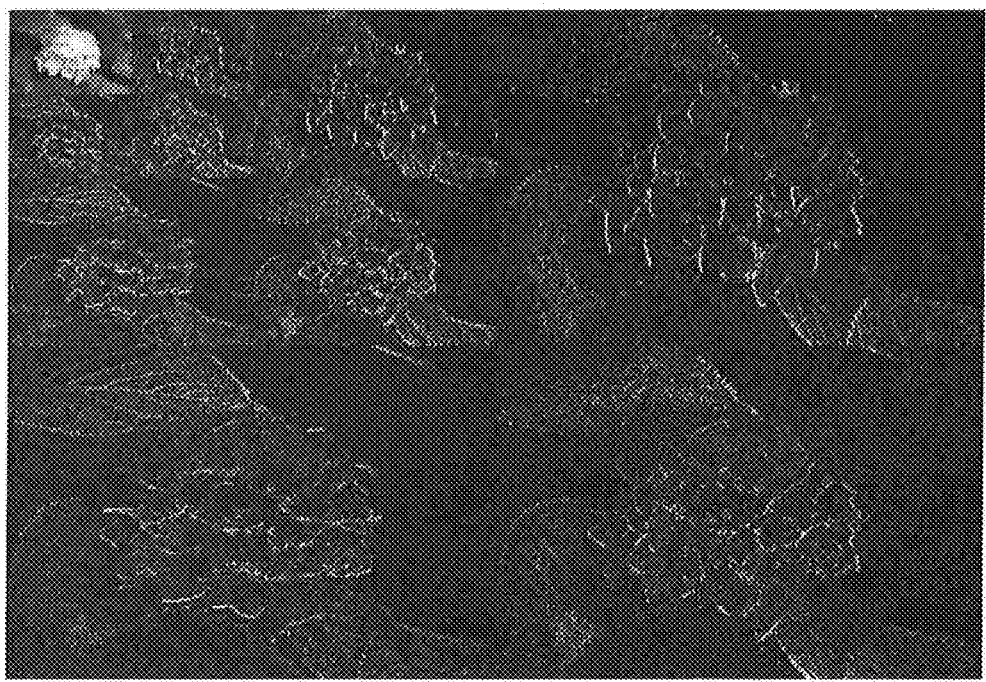
FIG. 6 is a view showing an image obtained by performing wavelet transformation on the original image of FIG. 5 (decomposition level 3)

At the decomposition level 1, the band component LL1 corresponds to essential information of the image. Further, with the band component LL1, it is possible to provide an image having a size that is ¼ the image obtained before the decomposition. The band component HL1 corresponds to information of an edge extending in the vertical direction, and the band component LH1 corresponds to information of an edge extending in the horizontal direction. The band component HH1 corresponds to information of an edge extending in an oblique direction. The same applies to those at other decomposition levels. For example, the band components LL2, HL2, LH2, and HH2 at the decomposition level 2 have the same relationship as that of the band components LL1, HL1, LH1, and HH1 in a case where the band component LL1 obtained before the decomposition is regarded as an original image. FIG. 5 shows an exemplary original image, and FIG. 6 shows an image obtained by performing wavelet transformation on the original image of FIG. 5 till the decomposition level 3.

Figure 7:
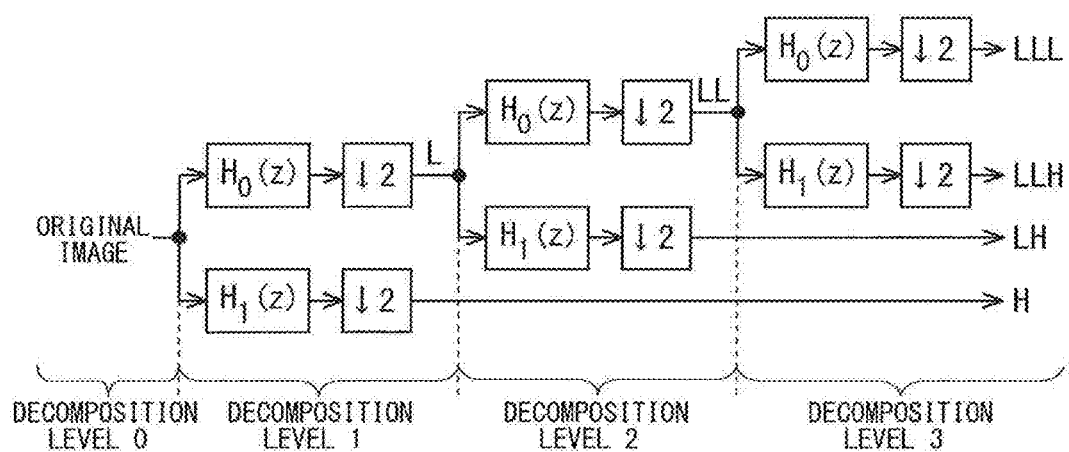
FIG. 7 is a diagram illustrating a two-divided filter bank group which achieves one-dimensional wavelet transformation.

The band division can be achieved by, for example, applying a two-divided filter bank to each of the vertical and horizontal directions. FIG. 7 shows an exemplary constitution of a two-divided filter bank group which achieves one-dimensional DWT. In the exemplary case of FIG. 7, the two-divided filter bank is constituted of a low-pass filter $H_0(z)$ which passes a low-frequency component, a high-pass filter $H_1(z)$ which passes a high-frequency component, and downsamplers provided on the downstream sides of the filters $H_0(z)$ and $H_1(z)$. Further, the downsampler thins out every other input signal to thereby halve a signal length, and outputs the signals. The one-dimensional DWT is implemented by repeatedly using the two-divided filter bank.

<Quantization Unit 40>

With reference back to FIG. 1, the quantization unit 40 performs scalar quantization on the wavelet coefficient supplied from the DWT unit 30 on the basis of a quantization step size. The quantization step size is set in accordance with, for example, a target image quality. Further, the quantization unit 40 performs a bit shift to prioritize the image quality of the ROI on the basis of ROI set information supplied from the ROI management unit 50.

As a typical use of the ROI, given is a Max-shift method as an optional function of JPEG 2000. In the Max-shift method, a ROI can be specified in an arbitrary shape. Further, the ROI is compressed in high quality while a non-ROI is compressed in low quality.

Figure 8:
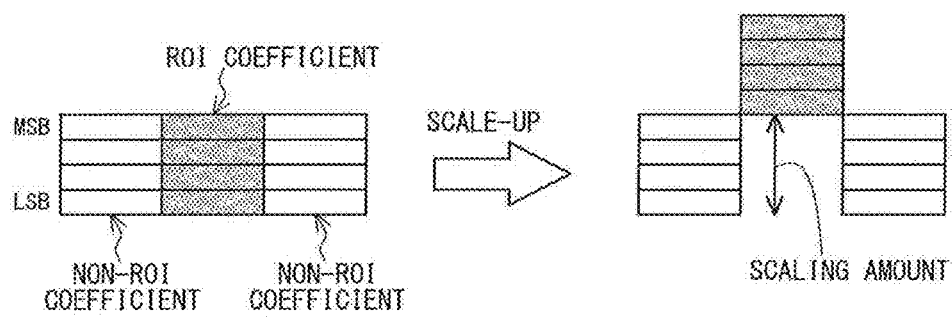
FIG. 8 is a conceptual diagram showing a bit shift on the basis of a Max-shift method (scale-up of an ROI coefficient)

Specifically, first, the maximum value max(Mb) among the wavelet coefficients corresponding to the non-ROI is obtained. Next, s (referred to as a scaling value) which satisfies s≥max(Mb) is obtained. Then, only the wavelet coefficient corresponding to the ROI is shifted by s bits toward the highest-order bit (MSB) side (see FIG. 8). The value of the wavelet coefficient corresponding to the ROI is thereby relatively scaled up by $2^s$. Further, the wavelet coefficient corresponding to the ROI is sometimes referred to as a ROI coefficient, and the wavelet coefficient corresponding to the non-ROI is sometimes referred to as a non-ROI coefficient.

When the max(Mb) is "255" in decimal (i.e., "11111111" in binary), for example, s=8 (bits). Further, also when the max(Mb) is "128" in decimal (i.e., "10000000" in binary), s=8 (bits), too. In these exemplary cases, the ROI coefficient is shifted by 8 bits toward the MSB side.

The compression ratio of the ROI can be set lower as compared with that of the non-ROI, and compressed data of high quality on the ROI can be obtained.

<ROI Management Unit 50>

The ROI management unit 50 supplies the ROI set information to the quantization unit 40, as described above. The ROI set information is provided by a so-called ROI mask. Further, the ROI mask is sometimes referred to simply as a mask.

The ROI mask used for the scale-up in the quantization unit 40 is a bit map corresponding to the wavelet plane. The bits of the bit map are provided corresponding to the wavelet coefficients of the wavelet plane, and a state of each bit indicates whether the corresponding wavelet coefficient corresponds to the ROI or the non-ROI.

The ROI mask corresponding to the wavelet plane can be generated by, for example, developing a ROI mask corresponding to the original image on the wavelet plane. Each of the bits in the ROI mask corresponding to the original image corresponds to a pixel in the original image. Hereinafter, the ROI mask corresponding to the original image is sometimes referred to as, for example, a ROI mask at an original image level (in other words, at the decomposition level 0), an original ROI mask, or an original mask. The ROI mask developed on the wavelet plane is sometimes referred to as, for example, a developed ROI mask, or a developed mask.

The ROI mask at the original image level can be generated by, for example, specifying an ROI (or a non-ROI) in the original image displayed on a display, by a pointing input device such as a mouse or the like. Alternatively, the original mask may be generated by analyzing original image data and extracting a region in the original image, which includes a specific color (e.g., the color of a flower), as the ROI. Still alternatively, the original mask may be generated by using other techniques.

Figure 9:
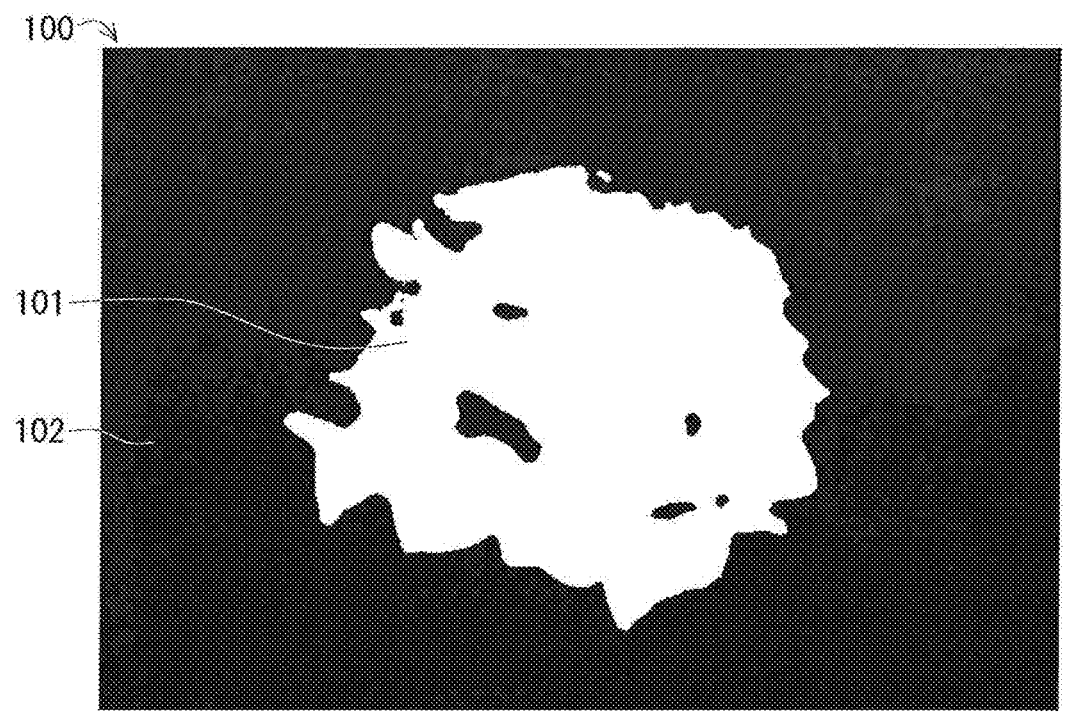
FIG. 9 is a view showing an ROI mask (decomposition level 0, i.e., original image level)
Figure 10:
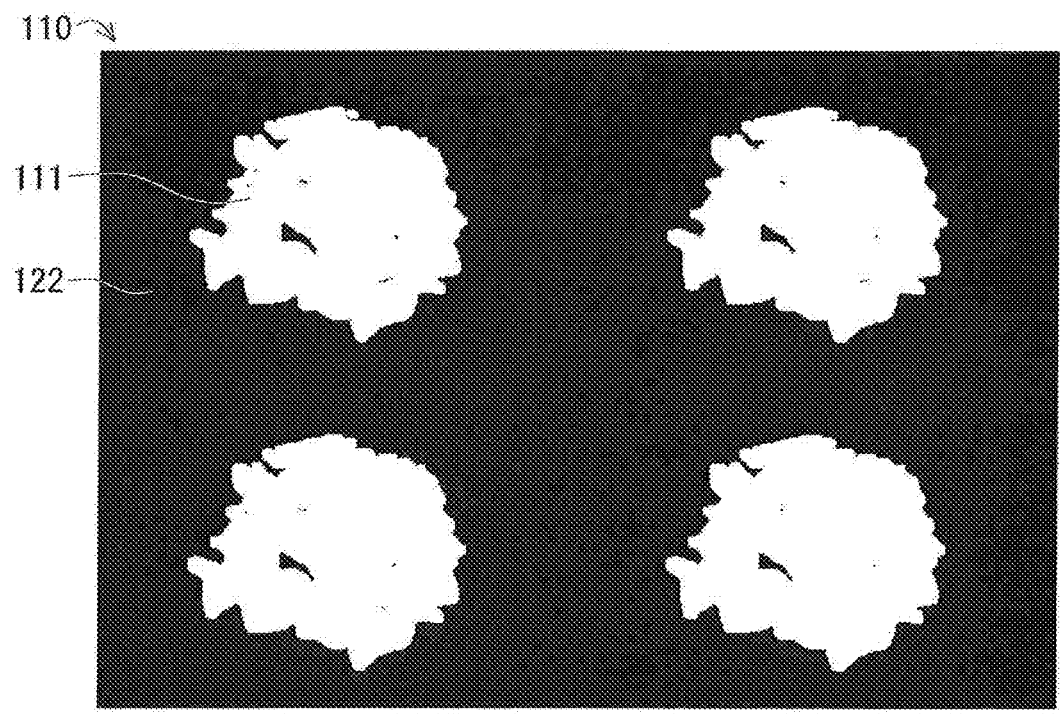
FIG. 10 is a view showing an ROI mask (decomposition level 1)
Figure 11:
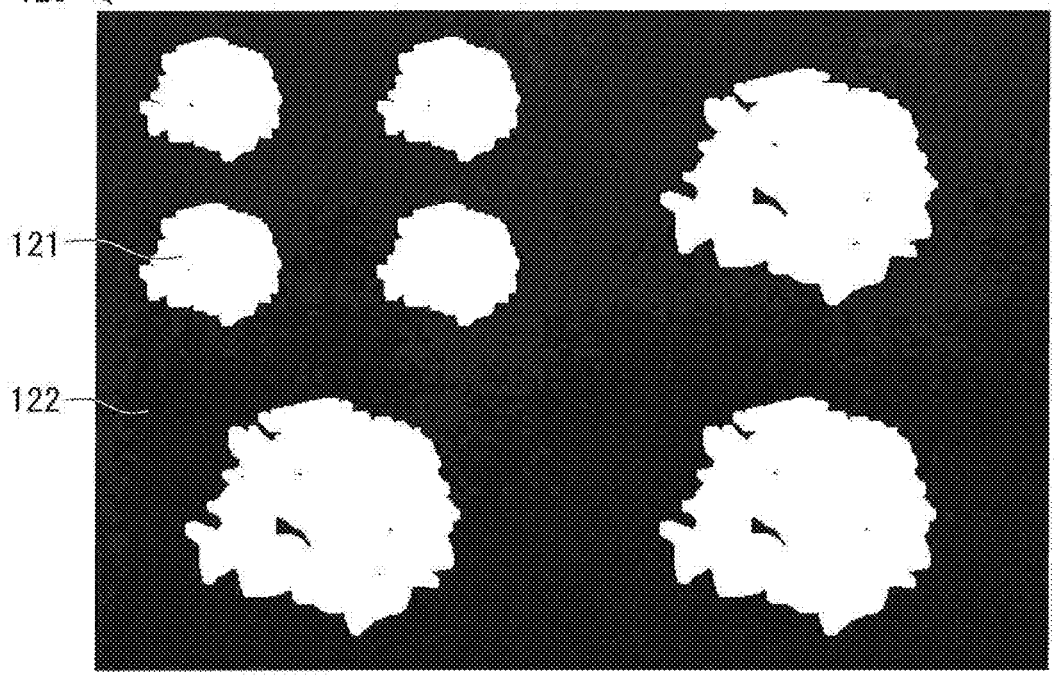
FIG. 11 is a view showing an ROI mask (decomposition level 2)
Figure 12:
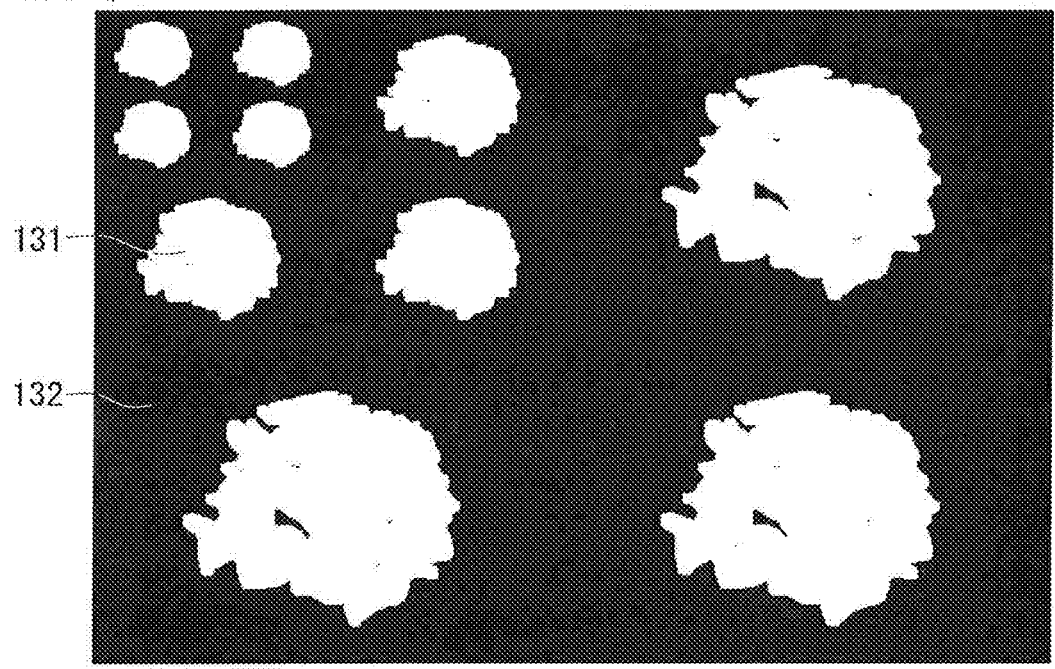
FIG. 12 is a view showing an ROI mask (decomposition level 3)

FIG. 9 is a view showing an original mask 100 in a case where a region of a flower in the original image of FIG. 5 is specified as an ROI. In the original mask 100, a white portion is an ROI corresponding portion 101 which corresponds to the ROI in the original image, and a black portion is a non-ROI corresponding portion 102 which corresponds to the non-ROI in the original image. Developed masks 110, 120, and 130 obtained by developing the original mask 100 shown in FIG. 9 on the wavelet planes (see FIGS. 2 to 4) at the decomposition levels 1, 2, and 3 are shown in FIGS. 10 to 12. Also in the developed masks 110, 120, and 130, ROI corresponding portions 111, 121, and 131 are shown in white and the non-ROI corresponding portions 112, 122, and 132 are shown in black.

A method of developing the ROI mask 100 at the original image level on the wavelet plane depends on the number of taps of a DWT filter.

Figure 13:
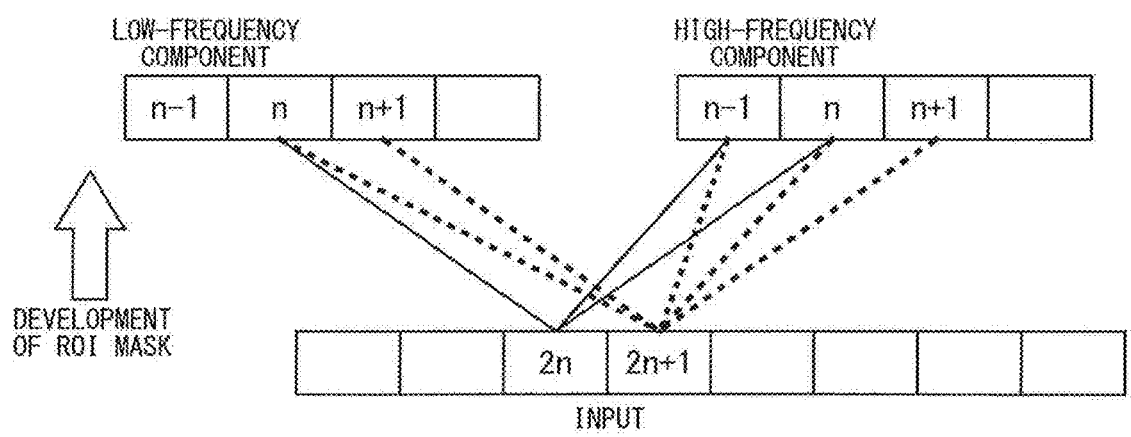
FIG. 13 is a diagram showing development of an ROI mask in a case where the wavelet transformation is performed by using a 5×3 filter.

When a 5×3 filter is used in a calculation of DWT, for example, the original mask can be developed as indicated in FIG. 13. In the 5×3 filter, the low-pass filter on the decomposition side has five taps and the high-pass filter on the decomposition side has three taps.

As shown in FIG. 13, when an even-numbered (represented as 2n-th where n is an integer) pixel (in other words, pixel data) of the original image is included in the ROI, n-th data on the low-frequency component side (among data outputted from the downsampler on the low-pass filter side, with reference to the exemplary case of FIG. 7) is set to the ROI corresponding portion 111 in the developed mask 110 at the decomposition level 1. Also on the high-frequency component side, $\{n-1\}$th and n-th data (among data outputted from the downsampler on the high-pass filter side, with reference to the exemplary case of FIG. 7) are set to the ROI corresponding portion 111 in the developed mask 110 at the decomposition level 1.

On the other hand, when an odd-numbered (represented as $\{2n+1\}$th) pixel of the original image is included in the ROI, n-th and $\{n+1\}$th data on the low-frequency component side and $\{n-1\}$th to $\{n+1\}$th data on the high-frequency component side are set to the ROI corresponding portion 111 in the developed mask 110 at the decomposition level 1.

Further, FIG. 13 illustrates a correspondence between the original image and the wavelet plane at the decomposition level 1. However, recursive development into a deeper level can be understood in the same way.

Figure 14:
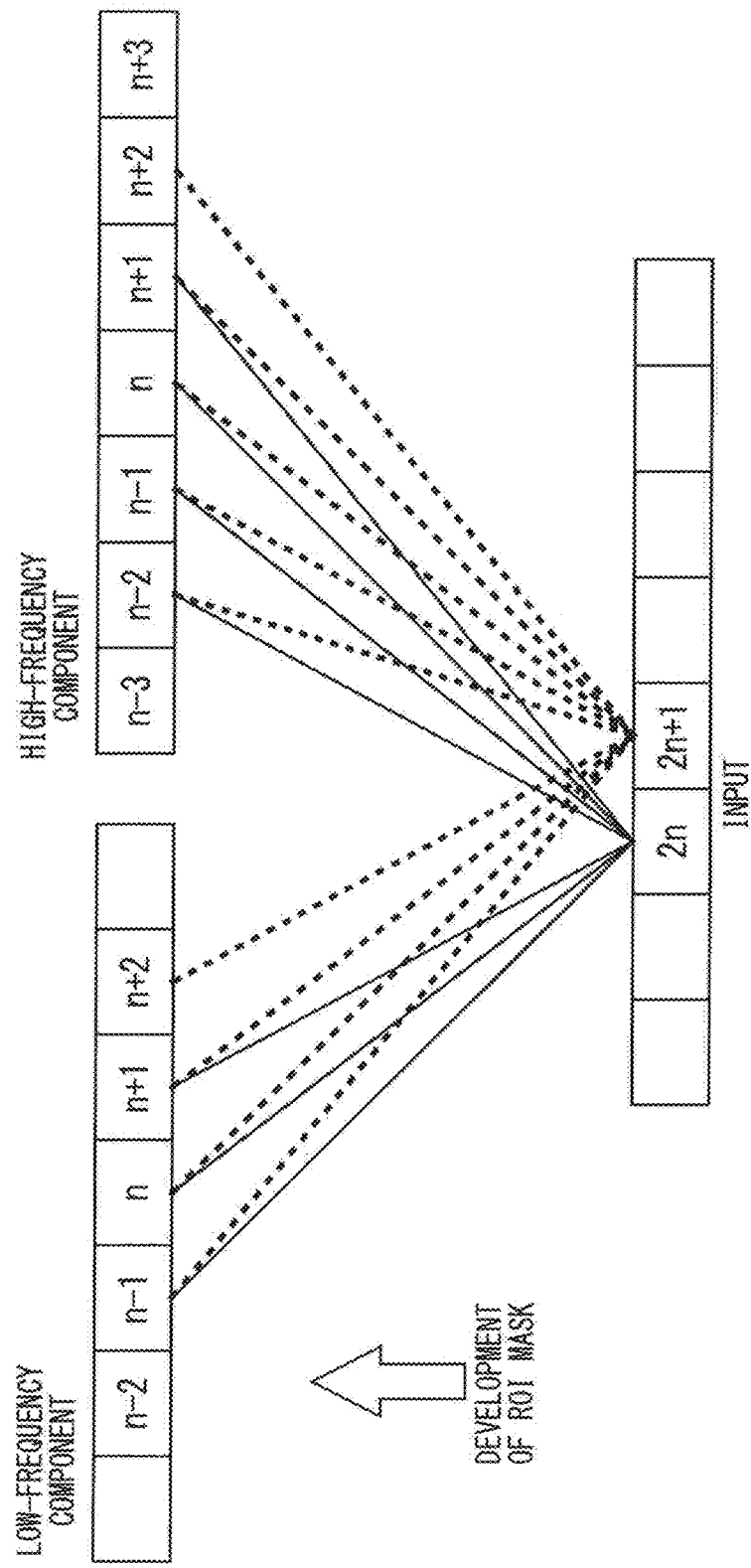
FIG. 14 is a diagram showing development of an ROI mask in a case where the wavelet transformation is performed by using a Daubechies 9×7 filter.

When a Daubechies 9×7 filter is used in a calculation of DWT, for example, the original mask can be developed as indicated in FIG. 14. In the Daubechies 9×7 filter, the low-pass filter on the decomposition side has nine taps and the high-pass filter on the decomposition side has seven taps.

As shown in FIG. 14, when an even-numbered (represented as 2n-th) pixel of the original image is included in the ROI, $\{n-1\}$th to $\{n+1\}$th data on the low-frequency component side and $\{n-2\}$th to $\{n|1\}$th data on the high-frequency component side are set to the ROI corresponding portion 111 in the developed mask 110 at the decomposition level 1.

On the other hand, when an odd-numbered (represented as $\{2n+1\}$th) pixel of the original image is included in the ROI, $\{n-1\}$th to $\{n+2\}$th data on the low-frequency component side and $\{n-2\}$th to $\{n+2\}$th data on the high-frequency component side are set to the ROI corresponding portion 111 in the developed mask 110 at the decomposition level 1.

Further, FIG. 14 illustrates a correspondence between the original image and the wavelet plane at the decomposition level 1. However, recursive development into a deeper level can be understood in the same way.

For example, the ROI management unit 50 generates a developed mask in accordance with a set value of the decomposition level, from the original mask 100 which is given in advance. Alternatively, a developed mask at each decomposition level may be given to the ROI management unit 50 in advance. The developed mask is used when the quantization unit 40 determines whether each wavelet coefficient is a ROI coefficient or not. This determination may be performed by the quantization unit 40 or the ROI management unit 50.

<Coding Unit 60>

With reference back to FIG. 1, the coding unit 60 performs a predetermined coding on a quantized wavelet coefficient generated by the quantization unit 40 (scaled by using the Max-shift method herein). In the predetermined coding, for example, entropy coding is performed in accordance with EBCOT (Embedded Block Coding with Optimized Truncation) to achieve bit-plane coding. In the exemplary case of FIG. 1, the coding unit 60 includes a coefficient bit modeling unit 61 and an entropy coding unit 62.

The coefficient bit modeling unit 61 performs bit modeling on the quantized wavelet coefficient. Herein, the bit modeling is performed by using the already-known technique, and detailed description will be omitted.

The coefficient bit modeling unit 61 divides the inputted band component into regions each having about 32×32 or 64×64 size, the regions being termed "code blocks". Then, the coefficient bit modeling unit 61 assigns bit values constituting a binary value of each quantized wavelet coefficient in the code block to different bit planes, respectively. The bit modeling is performed in a unit of bit plane.

The entropy coding unit 62 performs entropy coding on the data generated by the coefficient bit modeling unit 61, to thereby generate coded image data. As the entropy coding, for example, the already-known arithmetic coding is used.

Further, the coding unit 60 may control the amount of codes by performing rate control on the coded image data generated by the entropy coding unit 62.

<Bit Stream Generation Unit 70>

The bit stream generation unit 70 generates a bit stream conforming to JPEG 2000 by multiplexing the coded image data outputted from the coding unit 60 and the additional information and outputs the bit stream as compressed image data. As the additional information, for example, used is (are) header information, a layer structure, scalability information, a quantization table, or/and the scaling amount applied in the Max-shift method.

<Image Decoding Apparatus 200>

Figure 15:
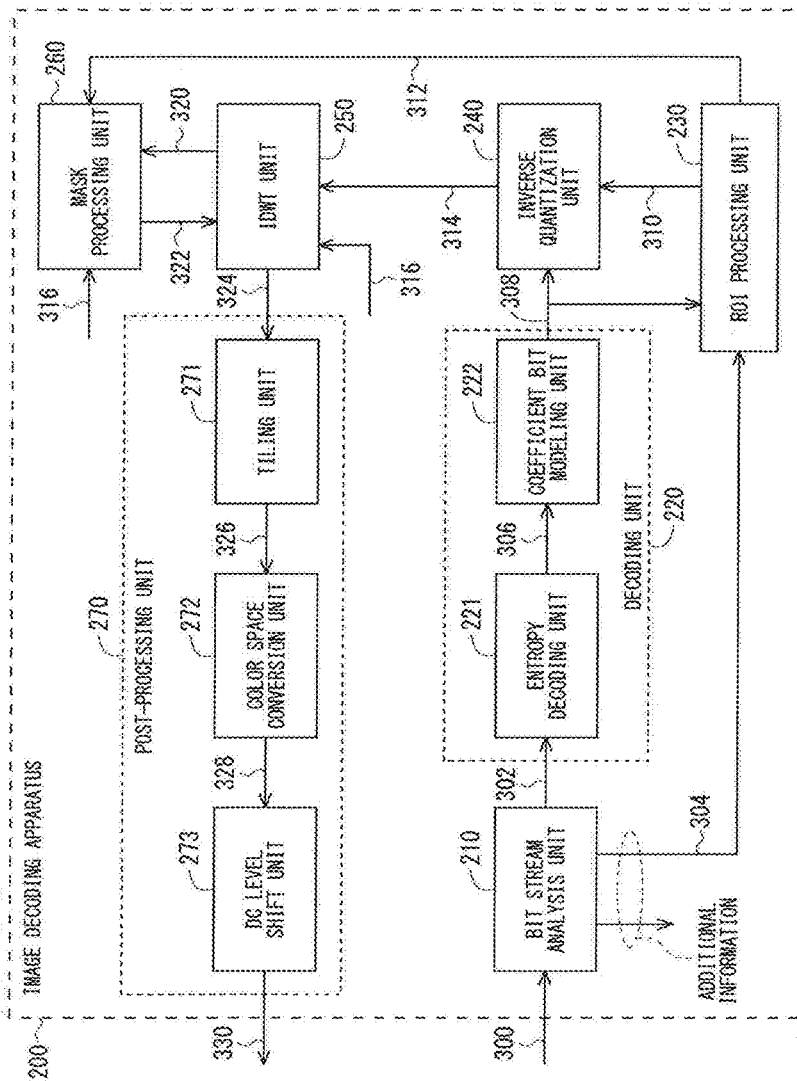
FIG. 15 is a block diagram showing an image decoding apparatus.

FIG. 15 is a block diagram showing an image decoding apparatus. The image decoding apparatus 200 illustrated in FIG. 15 includes a bit stream analysis unit 210, a decoding unit 220, an ROI processing unit 230, an inverse quantization unit 240, an inverse wavelet transformation unit (hereinafter, also referred to as an IDWT unit) 250, a mask processing unit 260, and a post-processing unit 270.

<Bit Stream Analysis Unit 210>

The bit stream analysis unit 210 analyzes a bit stream 300 conforming to JPEG 2000 and extracts coded image data 302 and additional information from the bit stream 300. The coded data 302 is supplied to the decoding unit 220. Various additional information are supplied to predetermined processing units, respectively. Particularly, the additional information 304 on the scaling amount of the Max-shift method is supplied to the ROI processing unit 230. Hereinafter, the additional information 304 is sometimes referred to as a scaling amount 304.

<Decoding Unit 220>

The decoding unit 220 performs a predetermined decoding on the coded image data 302. The predetermined decoding is basically an inverse processing of the coding performed by the coding unit 60 shown in FIG. 1, except the code amount control. By performing the predetermined decoding, from the coded image data, generated is quantized image data 308 constituted of the quantized wavelet coefficients. In the exemplary case of FIG. 15, the decoding unit 220 includes an entropy decoding unit 221 and a coefficient bit modeling unit 222.

The entropy decoding unit 221 performs entropy decoding on the coded image data 302, to thereby generate bit data 306. The entropy decoding is an inverse processing of the entropy coding performed by the entropy coding unit 62 shown in FIG. 1.

The coefficient bit modeling unit 222 performs bit modeling on the bit data 306 generated by the entropy decoding unit 221, to thereby restore the quantized wavelet coefficient. Quantized image data 308 is thereby generated. Herein, the bit modeling is an inverse processing of that performed by the coefficient bit modeling unit 61 shown in FIG. 1. The quantized image data 308 generated by the coefficient bit modeling unit 222 is supplied to the ROI processing unit 230 and the inverse quantization unit 240.

<ROI Processing Unit 230>

Figure 16:
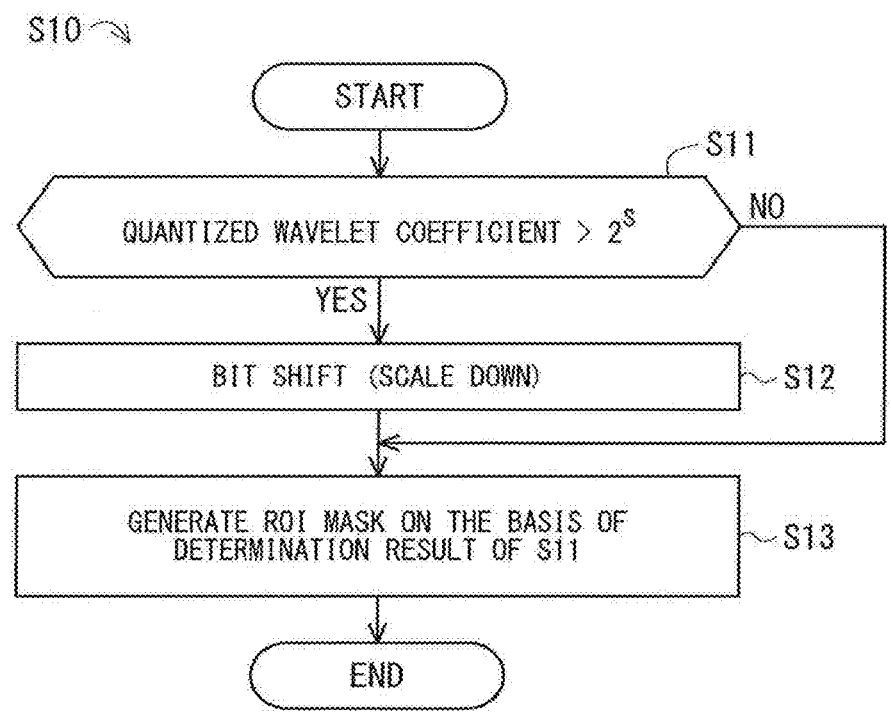
FIG. 16 is a flowchart showing an operation of an ROI processing unit.

FIG. 16 is a flowchart showing a process step S10 executed by the ROI processing unit 230. In the exemplary case of FIG. 16, in Step S11, the ROI processing unit 230 determines whether each of the plurality of quantized wavelet coefficients included in the quantized image data 308 is associated with the ROI or the non-ROI in the original image, on the basis of the scaling amount 304.

When the scaling amount 304 is $2^s$ ("s" denotes a scaling value), for example, each quantized wavelet coefficient is compared with $2^s$. The quantized wavelet coefficient larger than $2^s$ is determined as a scaled-up coefficient (in other words, an ROI coefficient). On the other hand, the quantized wavelet coefficient not larger than $2^s$ is determined as a not-scaled-up coefficient (in other words, a non-ROI coefficient).

Figure 17:
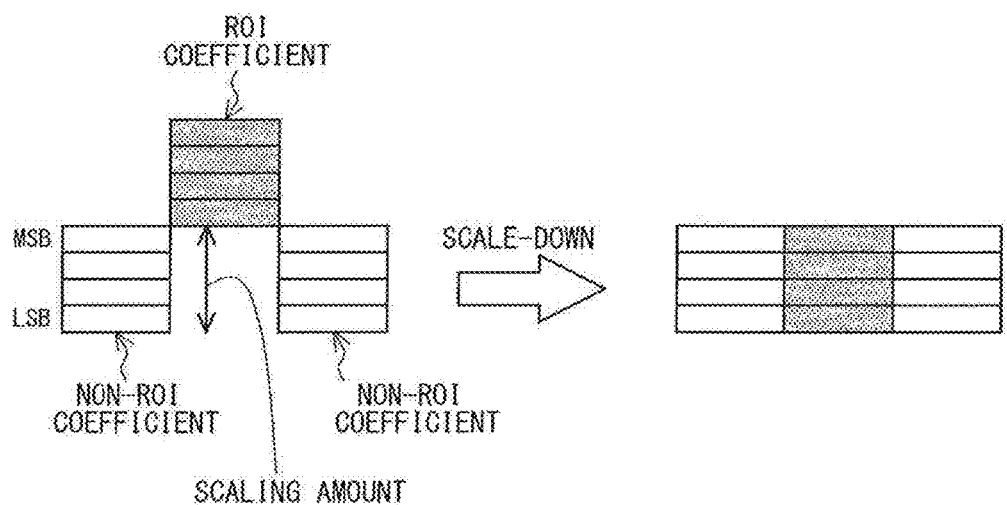
FIG. 17 is a conceptual diagram showing a bit shift on the basis of the Max-shift method (scale-down of an ROI coefficient)

Then, in Step S12, the ROI processing unit 230 performs a bit shift on the quantized wavelet coefficient which is determined to have been scaled up by s bits toward the lowest-order bit (LSB) side. In other words, scale-down is performed on the quantized wavelet coefficient which is a target, on the basis of the scaling amount 304. A conceptual diagram of the scale-down is shown in FIG. 17.

The quantized image data 310 after Step S12 is supplied to the inverse quantization unit 240.

Further, the scaling amount 304 acquired from the bit stream analysis unit 210 (in other words, the scaling amount transmitted from the image coding apparatus 10) may be a scaling value s or the above-described value (i.e., $2^s$).

In Step S13, the ROI processing unit 230 generates an ROI mask (i.e., a developed mask) 312 corresponding to the decomposition level of the quantized image data, on the basis of the determination result of Step S11. Specifically, as described above, in Step S11, it is determined whether each of the quantized wavelet coefficients is associated with the ROI coefficient or the non-ROI coefficient. Therefore, by mapping the determination result, the developed mask 312 can be generated.

The developed mask generated in Step S13 corresponds to the developed mask used by the quantization unit 40 of the image coding apparatus 10 to select the quantized wavelet coefficient to be scaled up.

The ROI mask 312 generated in Step S13 is supplied to the mask processing unit 260.

When the input bit stream 300 does not include the scaling amount 304, for example, the ROI processing unit 230 does not perform the process step S10. Even in this case, according to the exemplary case of FIG. 15, the quantized wavelet coefficient is supplied from the decoding unit 220 to the inverse quantization unit 240.

Alternatively, even when the input bit stream 300 does not include the scaling amount 304, the ROI processing unit 230 may perform the process step S10 with zero set to the scaling amount. In this case, unlike in the exemplary case of FIG. 15, the supply of the quantized wavelet coefficient from the decoding unit 220 to the inverse quantization unit 240 can be omitted. Further, when the input bit stream 300 does not include the scaling amount 304, since an input image does not include any ROI, the mask generation process S13 may not be performed.

Furthermore, the bit shift process S12 may be performed by the inverse quantization unit 240. Even in this case, the mask generation process S13 is performed by the ROI processing unit 230. The coefficient determination process S11 may be performed by at least one of the inverse quantization unit 240 and the ROI processing unit 230.

<Inverse Quantization Unit 240>

With reference back to FIG. 15, the inverse quantization unit 240 performs scalar inverse quantization on the quantized image data 308 or 310 supplied from the decoding unit 220 or the ROI processing unit •230. This inverse quantization is an inverse processing of the quantization performed by the quantization unit 40 shown in FIG. 1. By this inverse quantization, the quantized wavelet coefficient is transformed into the wavelet coefficient, and consequently first image data 314 constituted of a plurality of wavelet coefficients is generated. The first image data 314 is supplied to the IDWT unit 250.

<IDWT Unit 250>

The IDWT unit 250 performs integer-type or real-number-type inverse discrete wavelet transformation (IDWT). The IDWT is an inverse processing of the DWT performed by the DWT unit 30 shown in FIG. 1, and in the IDWT, the band component is recursively synthesized. Further, when the DWT is performed in a unit of tile, the IDWT is also performed in a unit of tile.

Band synthesis by the IDWT can be achieved by using the two-divided filter bank group which achieves the one-dimensional IDWT. The two-divided filter bank illustrated in FIG. 18 consists of a low-pass filter $G_0(z)$ which passes a low-frequency component, a high-pass filter $G_1(z)$ which passes a high-frequency component, upsamplers provided on the upstream sides of the filters $G_0(z)$ and $G_1(z)$, and an adder which adds the outputs from the filters $G_0(z)$ and $G_1(z)$ to each other. The upsampler inserts a zero value between input signals to thereby double a signal length, and outputs the signals. The one-dimensional IDWT is achieved by repeatedly using the two-divided filter bank.

The number of executions of the synthesis in the IDWT is termed a synthesis level. The synthesis level is not limited to those shown in exemplary case of FIG. 18. It is assumed that a synthesis level in a state before the IDWT (the state at the decomposition level 3 in the exemplary case of FIG. 18) is represented as 0.

Herein, the IDWT unit 250 acquires the first image data 314 from the inverse quantization unit 240 and performs the IDWT on the first image data 314 once or a plurality of times, to thereby generate second image data 320 at a specified decomposition level. A specified value 316 of the decomposition level of the second image data 320 is given by the IDWT unit 250 and the mask processing unit 260. As described later, the second image data 320 is transformed into masked image data 322 by the mask processing unit 260. The IDWT unit 250 performs the IDWT on the masked image data 322 till the decomposition level 0, to thereby generate image data 324 at the decomposition level 0, i.e., decoded image data 324. The decoded image data 324 is supplied to the post-processing unit 270.

<Mask Processing Unit 260>

FIG. 19 is a block diagram showing the mask processing unit 260. In the exemplary case of FIG. 19, the mask processing unit 260 includes a mask restoration unit 261 and a mask execution unit 262.

The mask restoration unit 261 acquires the ROI mask 312 from the ROI processing unit 230 and also acquires the above specified value 316 of the decomposition level of the second image data 320. Then, the mask restoration unit 261 performs a predetermined mask restoration process on the ROI mask 312 once or a plurality of times, to thereby generate an ROI mask 318 at the same decomposition level as that of the second image data 320. Hereinafter, the ROI mask 318 is sometimes referred to as, for example, a restored ROI mask 318 or a restored mask 318.

The above specified value 316 is a value specifying the decomposition level of the second image data 320 which is passed from the IDWT unit 250 to the mask processing unit 260 and also a value specifying the decomposition level till which the ROI mask 312 generated by the ROI processing unit 230 should be restored. The specified value 316 is given to, for example, the image decoding apparatus 200 in advance. The specified value 316 may be fixed, or may be changed by a user or the like.

When the image data transmitted in the input bit stream 300 is wavelet-transformed till the decomposition level 3 (see FIGS. 4 and 6), for example, the ROI mask 312 generated by the ROI processing unit 230 corresponds to the decomposition level 3 (see FIG. 12). In this exemplary case, when the specified value 316 is set to the decomposition level 2, the mask restoration unit 261 restores the ROI mask 120 shown in FIG. 11. Similarly, when the specified value 316 is set to the decomposition level 1, the mask restoration unit 261 restores the ROI mask 110 shown in FIG. 10. Further, when the specified value 316 is set to the decomposition level 0, the mask restoration unit 261 restores the ROI mask 100 shown in FIG. 9.

The above predetermined mask restoration process is a process of generating the ROI mask (also referred to as a second ROI mask) from the ROI mask to be restored (also referred to as a first ROI mask) on the basis of a predetermined mask restoration condition. The decomposition level of the second ROI mask is lower than that of the first ROI mask by one level.

The above predetermined mask restoration condition depends on the number of taps of an IDWT filter, in other words, the number of taps of the DWT filter in the image coding apparatus 10.

When the 5×3 filter is used in a calculation of IDWT, for example, the above predetermined mask restoration condition includes a first condition and a second condition described below (see FIG. 20). Further, in the 5×3 filter, the low-pass filter on the decomposition side has five taps and the high-pass filter on the decomposition side has three taps.

The first condition defines that when at least one of n-th data in the low-frequency component and {n−1}th data and n-th data in the high-frequency component is associated with the ROI in the original image by the first ROI mask before the IDWT, the second ROI mask is formed so that 2n-th data is associated with the ROI after the IDWT. Further, it is assumed that n is an integer.

The second condition defines that when at least one of the n-th data and {n+1}th data in the low-frequency component and the {n−1}th data to {n+1}th data in the high-frequency component is associated with the ROI by the first ROI mask before the IDWT, the second ROI mask is formed so that {2n+1}th data is associated with the ROI after the IDWT.

When the Daubechies 9×7 filter is used in a calculation of IDWT, for example, the above predetermined mask restoration condition includes a third condition and a fourth condition described below (see FIG. 21). In the Daubechies 9×7 filter, the low-pass filter on the decomposition side has nine taps and the high-pass filter on the decomposition side has seven taps.

The third condition defines that when at least one of {n−1}th data to {n|1}th data in the low-frequency component and {n−2}th data to {n+1}th data in the high-frequency component is associated with the ROI in the original image by the first ROI mask before the IDWT, the second ROI mask is formed so that 2n-th data is associated with the ROI after the IDWT.

The fourth condition defines that when at least one of the {n−1}th data to {n+2}th data in the low-frequency component and the {n−2}th data to {n+2}th data in the high-frequency component is associated with the ROI by the first ROI mask before the IDWT, the second ROI mask is formed so that {2n+1}th data is associated with the ROI after the IDWT.

By performing the above-described predetermined mask restoration process once or a plurality of times in accordance with the specified value 316 of the decomposition level, the restored ROI mask 318 at a decomposition level specified by the specified value 316 can be generated. Further, when the predetermined mask restoration process is performed a plurality of times, the predetermined mask restoration process can be performed recursively a plurality of times.

FIG. 22 is a flowchart showing a process step S20 executed by the mask restoration unit 261. In the exemplary case of FIG. 22, in Step S21, the current decomposition level of the ROI mask (in other words, the decomposition level of the above-described first ROI mask) is compared with the decomposition level specified by the specified value 316.

When the current decomposition level of the ROI mask is larger than the specified value 316, in Step S22, the current ROI mask is restored by one level. In other words, a ROI mask having a decomposition level lower by one level (i.e., the above-described second ROI mask) is generated. Then, Step S21 is performed again.

In contrast, when the current decomposition level of the ROI mask is not larger than the specified value 316, more specifically, when the ROI mask having a decomposition level specified by the specified value 316 is generated, the process step S20 is ended, and the process step S30 (see FIG. 23) is performed by the mask execution unit 262.

<Mask Execution Unit 262>

With reference back to FIG. 19, the mask execution unit 262 acquires the restored ROI mask 318 having a decomposition level specified by the specified value 316, from the mask restoration unit 261. Further, the mask execution unit 262 acquires the second image data 320 having a decomposition level specified by the specified value 316, from the IDWT unit 250. Then, the mask execution unit 262 applies the restored ROI mask 318 to the second image data 320, to thereby generate the masked image data 322.

FIG. 23 is a flowchart showing a process step S30 executed by the mask execution unit 262. In the exemplary case of FIG. 23, in Step S31, it is determined whether the wavelet coefficient in the second image data 320 acquired from the IDWT unit 250 is set to the ROI corresponding portion in the restored ROI mask 318 or not.

The wavelet coefficient which is determined not to be set to the ROI corresponding portion (in other words, to be a non-ROI coefficient) is subjected to data replacement in Step S32. In contrast, the wavelet coefficient which is determined to be set to the ROI corresponding portion (in other words, to be an ROI coefficient) is not subjected to data replacement.

The mask execution unit 262 performs the process step S30 on all the wavelet coefficients in the second image data 320. The masked image data 322 is thereby generated from the second image data 320.

The masked image data 322 is passed to the IDWT unit 250. As described above, the IDWT unit 250 performs the IDWT on the masked image data 322 till the decomposition level 0, to thereby generate the image data 324 at the decomposition level 0, in other words, the decoded image data 324.

<Post-Processing Unit 270>

With reference back to FIG. 15, the post-processing unit 270 perform a predetermined post-processing on the decoded image data 324 outputted from the IDWT unit 250. Herein, the predetermined post-processing is an inverse processing of the predetermined preprocessing performed by the image coding apparatus 10 shown in FIG. 1. In the exemplary case of FIG. 15, the post-processing unit 270 includes a tiling unit 271, a color space conversion unit 272, and a DC level shift unit 273.

The tiling unit 271 performs an inverse processing of the processing performed by the tiling unit 23 in the image coding apparatus 10 shown in FIG. 1. Specifically, the tiling unit 271 synthesizes the decoded image data 324 in a unit of tile, which is outputted from the IDWT unit 250, to thereby generate a frame of image data 326. When the decoded image data 324 is not supplied in a unit of tile, in other words, when the DWT is not performed in a unit of tile, the processing by the tiling unit 271 is omitted. Alternatively, the tiling unit 271 itself may be omitted.

The color space conversion unit 272 performs an inverse processing of the processing performed by the color space conversion unit 22 in the image coding apparatus 10 shown in FIG. 1. For example, the image data 326 outputted from the tiling unit 271 is converted into the RGB component. The DC level shift unit 273 converts the DC level of image data 328 outputted from the color space conversion unit 272 as necessary. In the exemplary case of FIG. 15, image data 330 outputted from the DC level shift unit 273 becomes output image data of the image decoding apparatus 200.

<Effects Etc.>

Herein, the exemplary case has been described above where the IDWT unit 250 performs the IDWT on the first image data 314 once or a plurality of times, to thereby generate the second image data 320 at the specified decomposition level. In other words, in this exemplary case, the decomposition level (specified by the specified value 316) of the second image data 320 is lower than that of the first image data 314.

As the specified value 316, however, the same value as that of the decomposition level of the first image data 314 can be specified. Specifically, in this exemplary case, the IDWT unit 250 does not perform the IDWT on the first image data 314 acquired from the inverse quantization unit 240 and supplies the first image data 314 to the mask execution unit 262, instead of the second image data 320.

Further, in this exemplary case, the mask restoration unit 261 does not perform the predetermined mask restoration process on the ROI mask 312 acquired from the ROI processing unit 230 and supplies the ROI mask 312 to the mask execution unit 262, instead of the restored ROI mask 318.

As a result, the mask execution unit 262 applies the ROI mask 312 to the first image data 314, to thereby generate the masked image data 322.

Further, as the specified value 316, the decomposition level 0 can be specified. In this exemplary case, the decomposition level of the second image data 320 supplied to the mask execution unit 262 is zero. For this reason, the second image data 320 is constituted of, for example, pixel values of the YCbCr component, instead of the wavelet coefficients. Furthermore, since the masked image data 322 also has the decomposition level 0, it is not necessary to perform the IDWT and the masked image data 322 is handled as the decoded image data 324. In this case, the mask execution unit 262 may pass the masked image data 322 to the IDWT unit 250, or to the post-processing unit 270.

Figure 24:
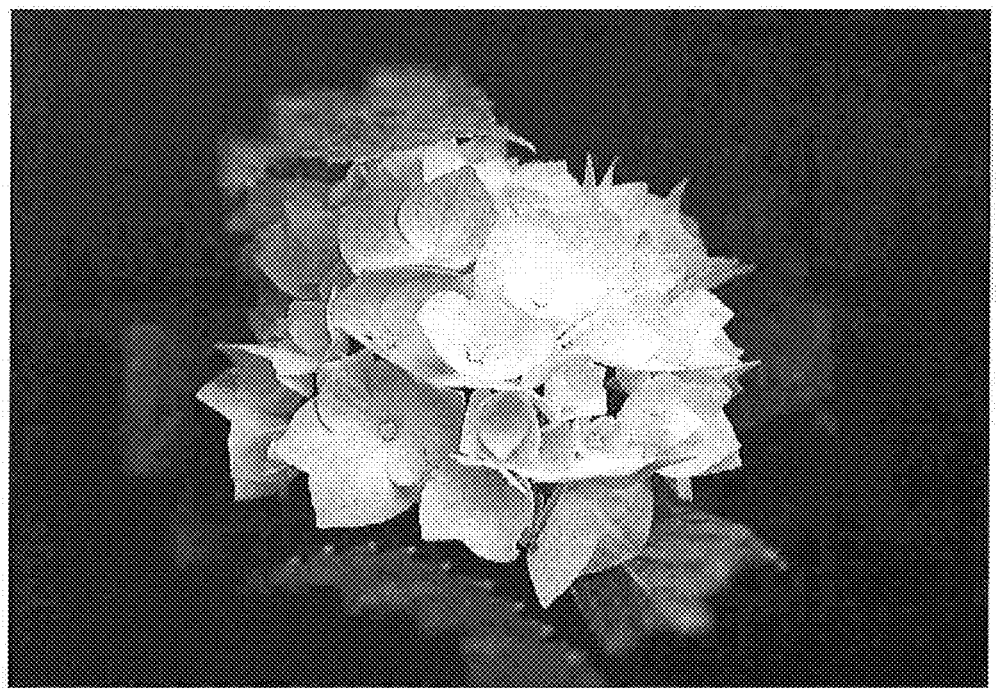
FIG. 24 is a view showing a decoded image in a case where a specified value of the decomposition level is 4.
Figure 25:
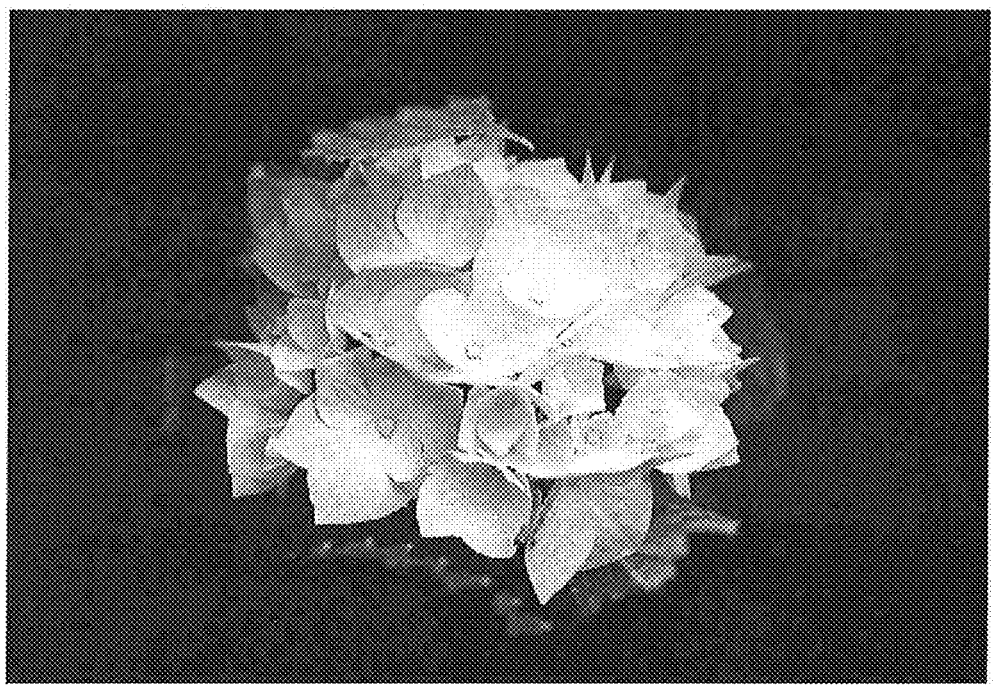
FIG. 25 is a view showing a decoded image in a case where a specified value of the decomposition level is 3.
Figure 26:
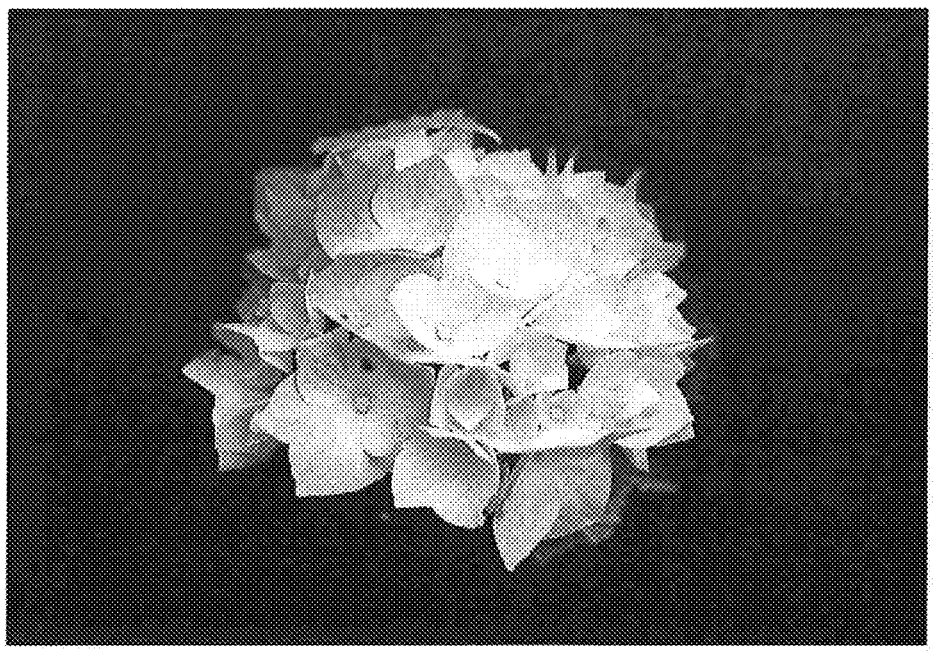
FIG. 26 is a view showing a decoded image in a case where a specified value of the decomposition level is 2.
Figure 27:
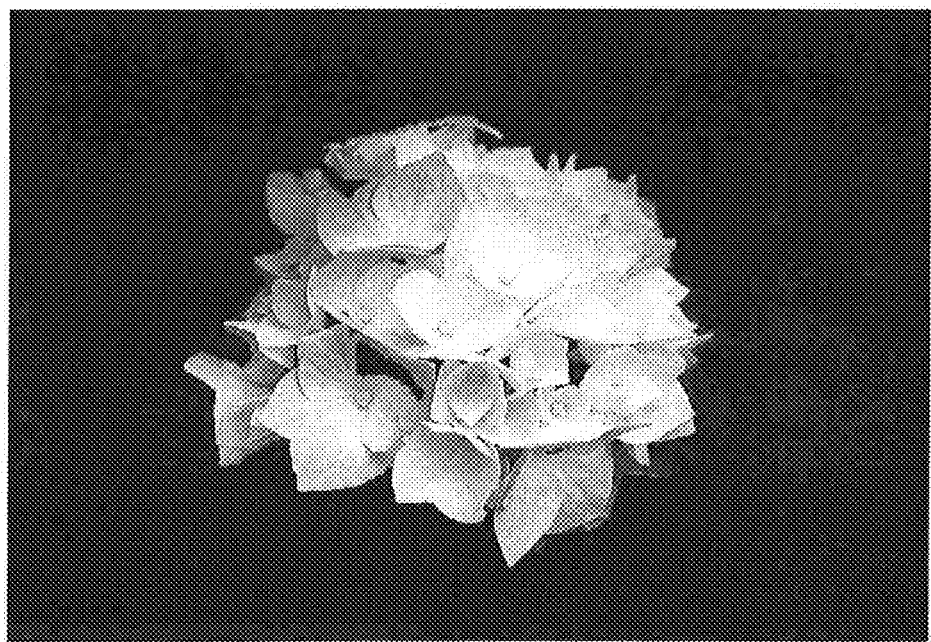
FIG. 27 is a view showing a decoded image in a case where a specified value of the decomposition level is 1.

FIGS. 24 to 28 each show a decoded image. FIG. 24 shows a case where a specified value 316 of the decomposition level is four, and FIGS. 25 to 28 show respective cases where a specified value 316 is three, two, one, and zero. In the exemplary cases of FIGS. 24 to 28, the coded image data 302 included in the bit stream 300 is band-divided till the decomposition level 5. For reference purposes, FIG. 29 shows an image obtained by decoding the coded image data 302 by a conventional method.

As can be seen from the comparison between FIGS. 24 to 28 and FIG. 29, the image decoding apparatus 200 can cut out a region specified as an ROI in the original image of FIG. 5. Further, as can be seen from the comparison among FIGS. 24 to 28, as the specified value 316 of the decomposition level is smaller, the region cut out from the original image approximates more to the ROI. In other words, by setting the specified value 316, it is possible to adjust a boundary of the region cut out from the original image.

Herein, there is a case where it is not easy to form the ROI mask with respect to the original image with high accuracy. Further, there is another case where it is intended to cut out a region larger than the ROI of the original image. Even in these cases, the image decoding apparatus 200 can adjust the region to be cut out.

Further, FIGS. 24 to 28 correspond to cases where the non-ROI coefficient is replaced with zero in Step S32 (see FIG. 23). In this case, a region which is not cut out from the original image can become a black background. The non-ROI coefficient, however, may be replaced with a predetermined value other than zero.

Furthermore, all the non-ROI coefficients may be replaced with different values. When the non-ROI coefficients are replaced with other wavelet coefficients generated from another original image, for example, an image can be synthesized. For example, a synthetic image in which a flower region is superposed on another original image can be obtained.

Further, in the image decoding apparatus 200, since the ROI mask is generated from the input image data to which the Max-shift method is applied, it is not necessary to acquire data of the ROI mask separately.

As to the above predetermined mask restoration condition, according to the first condition and the second condition (see FIG. 20), even when the IDWT is performed on the masked image data 322 till the decomposition level 0 (in other words, even when the decoded image data 324 is generated from the masked image data 322), no effect is produced on the ROI in the decoded image data. The same applies to the third condition and the fourth condition.

The exemplary case has been described above where the input bit stream 300 conforms to JPEG 2000. The input bit stream 300, however, may not conform to JPEG 2000. In other words, the image decoding apparatus 200 can provide the above-described processings and effects to any bit stream which is coded by using the wavelet transformation and includes coded image data and additional information on a scaling amount of the Max-shift method.

Further, though various processing units of the image decoding apparatus 200 are constructed by hardware, some or all of the processing units may be implemented by a program which functions a microprocessor.

While the invention has been shown and described in detail, the foregoing description is in all aspects illustrative and not restrictive. It is therefore understood that numerous modifications and variations can be devised without departing from the scope of the invention.

What is claimed is:

1. An image decoding apparatus comprising:
  circuitry configured to:
    extract coded image data and additional information on a scaling amount of the Max-shift method from a bit stream coded by using wavelet transformation;
    decode said coded image data to generate quantized image data constituted of a plurality of quantized wavelet coefficients;
    generate an ROI (Region Of Interest) mask corresponding to a decomposition level of said quantized image data, by determining whether each of said plurality of quantized wavelet coefficients is associated with an ROI or a non-ROI in an original image based on said scaling amount;
    inverse quantize said quantized image data after being scaled down based on said scaling amount to generate first image data constituted of a plurality of wavelet coefficients;
    perform inverse wavelet transformation on said first image data to generate second image data having a specified decomposition level;
    generate a restored ROI mask having the same decomposition level as that of said second image data by performing a predetermined mask restoration process on said ROI mask;
    apply said restored ROI mask to said second image data to generate masked image data; and
    output decoded image data by performing said inverse wavelet transformation on said masked image data until a decomposition level becomes zero.

2. The image decoding apparatus according to claim 1 wherein
  said circuitry is further configured to apply said ROI mask instead of said restored ROI mask, to said first image data instead of said second image data, to generate said masked image data when said specified decomposition level is the same decomposition level as that of said first image data.

3. The image decoding apparatus according to claim 1, wherein
  when said specified decomposition level is a decomposition level of zero, said masked image data is handled as said decoded image data, without being subjected to said inverse wavelet transformation.

4. The image decoding apparatus according to claim 1, wherein
  said ROI mask and said restored ROI mask include an ROI corresponding portion and a non-ROI corresponding portion corresponding to said ROI and said non-ROI in said original image, respectively, and
  said circuitry is configured to generate said masked image data by replacing data which is set to said non-ROI corresponding portion in image data to be masked, with zero.

5. The image decoding apparatus according to claim 1, wherein
  said ROI mask and said restored ROI mask include an ROI corresponding portion and a non-ROI corresponding portion corresponding to said ROI and said non-ROI in said original image, respectively, and
  said circuitry is configured to generate said masked image data by replacing data which is set to said non-ROI corresponding portion in image data to be masked, with another data on another original image.

6. The image decoding apparatus according to claim 1, wherein
  said predetermined mask restoration process is a process of generating a second ROI mask from a first ROI mask to be restored, based on a predetermined mask restoration condition, said second ROI mask having a decomposition level which is lower than that of said first ROI mask by one level,
  said predetermined mask restoration condition in a case where a 5×3 filter is used for said inverse wavelet transformation includes a first condition and a second condition, where n is an integer, said first condition defining that when at least one of n-th data in a low-frequency component and {n−1}th data and n-th data in a high-frequency component is associated with said ROI in said original image by said first ROI mask before said inverse wavelet transformation, said second ROI mask is formed so that 2n-th data is associated with said ROI after said inverse wavelet transformation, and said second condition defining that when at least one of said n-th data and {n+1}th data in said low-frequency component and said {n−1}th data to {n+1}th data in said high-frequency component is associated with said ROI by said first ROI mask before said inverse wavelet transformation, said second ROI mask is formed so that {2n+1}th data is associated with said ROI after said inverse wavelet transformation.

7. The image decoding apparatus according to claim 1, wherein said predetermined mask restoration process is a process of generating a second ROI mask from a first ROI mask to be restored, based on a predetermined mask restoration condition, said second ROI mask having a decomposition level which is lower than that of said first ROI mask by one level, said predetermined mask restoration condition in a case where a Daubechies 9×7 filter is used for said inverse wavelet transformation includes a third condition and a fourth condition, where n is an integer, said third condition defining that when at least one of {n−1}th data to {n+1}th data in a low-frequency component and {n−2}th data to {n+1}th data in a high-frequency component is associated with said ROI in said original image by said first ROI mask before said inverse wavelet transformation, said second ROI mask is formed so that 2n-th data is associated with said ROI after said inverse wavelet transformation, and said fourth condition defining that when at least one of said {n−1}th data to {n+2}th data in said low-frequency component and said {n−2}th data to {n+2}th data in said high-frequency component is associated with said ROI by said first ROI mask before said inverse wavelet transformation, said second ROI mask is formed so that {2n+1}th data is associated with said ROI after said inverse wavelet transformation.

8. The image decoding apparatus according to claim 1, wherein said bit stream conforms to Joint Photographic Experts Group (JPEG) 2000.

9. The image decoding apparatus according to claim 1, wherein performing said predetermined mask restoration process a plurality of times includes performing said predetermined mask restoration process recursively a plurality of times.

10. An image decoding method comprising:

extracting coded image data and additional information on a scaling amount of the Max-shift method from a bit stream coded by using wavelet transformation;

decoding said coded image data to generate quantized image data constituted of a plurality of quantized wavelet coefficients;

generating an ROI (Region Of Interest) mask corresponding to a decomposition level of said quantized image data, by determining whether each of said plurality of quantized wavelet coefficients is associated with an ROI or a non-ROI in an original image based on said scaling amount;

inverse quantizing said quantized image data after being scaled down based on said scaling amount to generate first image data constituted of a plurality of wavelet coefficients;

performing inverse wavelet transformation on said first image data to generate second image data having a specified decomposition level;

generating a restored ROI mask having the same decomposition level as that of said second image data by performing a predetermined mask restoration process on said ROI mask;

applying said restored ROI mask to said second image data to generate masked image data; and outputting decoded image data by performing said inverse wavelet transformation on said masked image data until a decomposition level becomes zero.

11. The image decoding method according to claim 10, wherein when said specified decomposition level is the same decomposition level as that of said first image data, said masked image data is generated by applying said ROI mask instead of said restored ROI mask, to said first image data instead of said second image data.

12. The image decoding method according to claim 10, wherein when said specified decomposition level is a decomposition level of zero, said masked image data is handled as said decoded image data, without being subjected to said inverse wavelet transformation.

13. The image decoding method according to claim 10, wherein said ROI mask and said restored ROI mask include an ROI corresponding portion and a non-ROI corresponding portion corresponding to said ROI and said non-ROI in said original image, respectively, and said masked image data is generated by replacing data which is set to said non-ROI corresponding portion in image data to be masked, with zero.

14. The image decoding method according to claim 10, wherein said ROI mask and said restored ROI mask include an ROI corresponding portion and a non-ROI corresponding portion corresponding to said ROI and said non-ROI in said original image, respectively, and said masked image data is generated by replacing data which is set to said non-ROI corresponding portion in image data to be masked, with another data on another original image.

15. The image decoding method according to claim 10, wherein said predetermined mask restoration process is a process of generating a second ROI mask from a first ROI mask to be restored, based on a predetermined mask restoration condition, said second ROI mask having a decomposition level which is lower than that of said first ROI mask by one level, said predetermined mask restoration condition in a case where a 5×3 filter is used for said inverse wavelet transformation includes a first condition and a second condition, where n is an integer, said first condition defining that when at least one of n-th data in a low-frequency component and {n−1}th data and n-th data in a high-frequency component is associated with said ROI in said original image by said first ROI mask before said inverse wavelet transformation, said second ROI mask is formed so that 2n-th data is associated with said ROI after said inverse wavelet transformation, and said second condition defining that when at least one of said n-th data and {n+1}th data in said low-frequency component and said {n−1}th data {n+1}th data in said high-frequency component is associated with said ROI by said first ROI mask before said inverse wavelet transformation, said second ROI mask is formed so that {2n+1}th data is associated with said ROI after said inverse wavelet transformation.

16. The image decoding method according to claim 10, wherein said predetermined mask restoration process is a process of generating a second ROI mask from a first ROI mask to be restored, based on a predetermined mask restoration condition, said second ROI mask having a decomposition level which is lower than that of said first ROI mask by one level, said predetermined mask restoration condition in a case where a Daubechies 9×7 filter is used for said inverse wavelet transformation includes a third condition and a fourth condition, where n is an integer, said third condition defining that when at least one of {n−1}th data to {n+1}th data in a low-frequency component and {n−2}th data to {n+1}th data in a high-frequency component is associated with said ROI in said original image by said first ROI mask before said inverse wavelet transformation, said second ROI mask is formed so that 2n-th data is associated with said ROI after said inverse wavelet transformation, and said fourth condition defining that when at least one of said {n−1}th data to {n+2}th data in said low-frequency component and said {n−2}th data to {n+2}th data in said high-frequency component is associated with said ROI by said first ROI mask before said inverse wavelet transformation, said second ROI mask is formed so that {2n+1}th data is associated with said ROI after said inverse wavelet transformation.

17. The image decoding method according to claim 10, wherein said bit stream conforms to Joint Photographic Experts Group (JPEG) 2000.

18. The image decoding method according to claim 10, wherein performing said predetermined mask restoration process a plurality of times includes performing said predetermined mask restoration process recursively a plurality of times.

* * * * *